(12) United States Patent
Han et al.

(10) Patent No.: US 10,115,488 B2
(45) Date of Patent: Oct. 30, 2018

(54) PASSIVE SAFETY EQUIPMENT FOR A NUCLEAR POWER PLANT

(71) Applicant: KOREA ATOMIC ENERGY RESEARCH INSTITUTE, Daejeon (KR)

(72) Inventors: Hun Sik Han, Seoul (KR); Young In Kim, Daejeon (KR); Kyung Jun Kang, Daejeon (KR); Sung Jae Yi, Daejeon (KR); Keung Koo Kim, Daejeon (KR); Ju Hyeon Yoon, Daejeon (KR); Jae Joo Ha, Daejeon (KR); Suhn Choi, Daejeon (KR); Cheon Tae Park, Daejeon (KR); Seung Yeob Ryu, Daejeon (KR); Joo Hyung Moon, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 255 days.

(21) Appl. No.: 15/024,795

(22) PCT Filed: Oct. 2, 2014

(86) PCT No.: PCT/KR2014/009348
§ 371 (c)(1),
(2) Date: Mar. 24, 2016

(87) PCT Pub. No.: WO2015/050410
PCT Pub. Date: Apr. 9, 2015

(65) Prior Publication Data
US 2016/0247585 A1    Aug. 25, 2016

(30) Foreign Application Priority Data

Oct. 4, 2013 (KR) .......... 10-2013-0118741
Oct. 1, 2014 (KR) .......... 10-2014-0132166

(51) Int. Cl.
*G21C 15/18* (2006.01)
*G21C 1/32* (2006.01)
(Continued)

(52) U.S. Cl.
CPC .......... *G21C 15/182* (2013.01); *G21C 1/322* (2013.01); *G21C 15/18* (2013.01); *G21C 15/24* (2013.01);
(Continued)

(58) Field of Classification Search
CPC ...... G21C 15/25; G21C 15/18; G21C 15/182; G21C 15/24; G21C 2015/185; G21C 1/322
(Continued)

(56) References Cited

U.S. PATENT DOCUMENTS

| 4,444,246 A | * | 4/1984 | Reinsch | G21C 15/18 376/407 |
| 4,687,626 A | * | 8/1987 | Tong | G21C 15/25 376/407 |

(Continued)

FOREIGN PATENT DOCUMENTS

| JP | 6-214082 | 8/1994 |
| JP | 8-5772 | 1/1996 |

(Continued)

OTHER PUBLICATIONS

International Search Report for PCT/KR2014/009348, dated Jan. 21, 2015, 2 pages.

*Primary Examiner* — Jack W Keith
*Assistant Examiner* — Daniel Wasil
(74) *Attorney, Agent, or Firm* — Scully Scott Murphy and Presser; Frank Digiglio

(57) ABSTRACT

The present invention provides passive safety equipment, comprising: a cooling part formed to cool a first fluid, which is emitted from a reactor coolant system or a steam generator, and a second fluid in a housing; and a circulation (Continued)

induction sprayer which is formed to spray the first fluid emitted from the reactor coolant system or the steam generator into the cooling part, has at least part thereof open to the inside of the housing such that the second fluid flows thereinto according to a drop in pressure caused by the spraying of the first fluid, and sprays the second fluid with the inflown first fluid.

20 Claims, 30 Drawing Sheets

(51) Int. Cl.
  *G21C 15/25*  (2006.01)
  *G21C 15/24*  (2006.01)
(52) U.S. Cl.
  CPC ....... *G21C 15/25* (2013.01); *G21C 2015/185* (2013.01); *G21Y 2002/104* (2013.01); *G21Y 2002/20* (2013.01); *G21Y 2004/30* (2013.01); *Y02E 30/40* (2013.01)

(58) Field of Classification Search
  USPC .................................................. 376/298, 407
  See application file for complete search history.

(56) References Cited

U.S. PATENT DOCUMENTS

| | | | | |
|---|---|---|---|---|
| 5,282,230 A | * | 1/1994 | Billig | ..................... G21C 15/18 |
| | | | | 376/283 |
| 5,398,267 A | * | 3/1995 | Reinsch | ................. G21C 15/18 |
| | | | | 376/407 |

FOREIGN PATENT DOCUMENTS

| | | |
|---|---|---|
| JP | 2012-233711 | 11/2012 |
| KR | 10-2013-0047871 | 5/2013 |

* cited by examiner

PASSIVE SAFETY EQUIPMENT FOR A NUCLEAR POWER PLANT

CROSS-REFERENCE TO RELATED APPLICATIONS

This application is the national phase of PCT application PCT/KR2014/009348 having an international filing date of 2 Oct. 2014, which claims the benefit of earlier filing date and right of priority to Korean Application No. 10-2013-0118741, filed on Oct. 4, 2013, and Korean Application No. 10-2014-0132166, filed on Oct. 1, 2014, the contents of which are incorporated by reference herein in their entirety.

BACKGROUND OF THE INVENTION

1. Field of the Invention

The present disclosure relates to a passive safety facility to enhance cooling performance and to reduce radioactive materials within the containment during an accident by introducing a fluid circulation increasing device and filter facility, and a nuclear power plant including the same.

2. Description of the Related Art

Reactor is divided into a loop type reactor and an integrated type reactor according to the installation location of main components. When the main components (a steam generator, a pressurizer, a pump, etc.) are installed outside a reactor vessel, it is classified as a loop type reactor (for example, commercial reactor: Korea). When the main components are installed within a reactor vessel, however, it is classified as an integrated type reactor (for example, SMART reactor: Korea).

Furthermore, reactor is divided into an active type reactor and a passive type reactor according to the implementation method of a safety system. The active type reactor uses an active component such as a pump operated by electric power from an emergency diesel generator or the like to drive the safety system. On the other hand, the passive type reactor uses a passive component operated by passive power such as gravity, gas pressure or the like to drive the safety system. When an accident occurs in the passive type reactor, the passive safety system maintains the reactor in a safe condition for at least a period of time (72 hours) according to the regulatory requirements by using only natural forces integrated in the system even without any operator actions or alternating current (AC) power of a safety class such as an emergency diesel. The operator action or non-safety system involvement is allowable in the passive safety system operation after 72 hours following the design basis accidents.

In the related art, a passive residual heat removal system and a passive containment cooling system have been configured using a steel containment and a secondary side of a steam generator (Korean Patent Publication No. 10-2013-0047871). However, it is preferable to adopt the reinforced concrete-type containment building rather than the steel containment applied to the related art due to difficulties in manufacturing and maintenance, low economic efficiency, and the like. Hereinafter, a passive residual heat removal system and a passive containment cooling system will be described, respectively.

The passive residual heat removal system is employed to remove heat in a reactor coolant system (sensible heat in the reactor coolant system and residual heat in the core) during an accident in various reactors including the integrated type reactor. For a cooling water circulation method of the passive residual heat removal system, two types are mainly used, such as a primary fluid circulating method to cool the reactor coolant system (AP1000: United States Westinghouse Company) and a secondary fluid circulating method using a steam generator to cool the reactor coolant system (SMART reactor: Korea), and a method of injecting primary fluid to a condensation tank to directly condensate it (CAREM: Argentina) is also partly used.

Furthermore, for a cooling method of the heat exchanger (condensation heat exchanger) in the passive residual heat removal system, a water-cooled type (AP1000) that is used most frequently, an air-cooled type (WWER 1000: Russia), and a water-air hybrid cooled type (IMR: Japan) are used. The heat exchanger in the passive residual heat removal system transfers heat received from the reactor coolant system to an outside (ultimate heat sink) through an emergency cooling water storage section or the like. For a method of heat exchanger, a condensation heat exchanger with high heat transfer efficiency using steam condensation phenomenon is mainly used.

The passive containment cooling system is one of several safety systems for reducing pressure, temperature, and a concentration of radioactive materials. The passive containment cooling system is employed to suppress the increase of pressure and to remove the heat within the containment (reactor building, containment or safeguard vessel) during an accident in various nuclear reactors including the integrated type reactor. For a configuration method of the function of the passive containment cooling system, a method of using a suppression tank for condensing the steam discharged to the containment building (Commercial BWR, CAREM: Argentina, IRIS: United States Westinghouse Company, etc.), a method of applying a steel containment and cooling an outer wall (water spray, air cooling) (AP1000: United States Westinghouse Company), and a method of using a heat exchanger (SWR1000: France Framatome ANP, AHWR: India, SBWR: United States GE), and the like are used.

As described above, in general, the passive residual heat removal system using the secondary side of the steam generator mainly uses a method of installing a heat sink (emergency cooling water storage section) outside the containment using a natural circulation. The cooling water that is cooled within the condensation heat exchanger is supplied to the steam generator by gravitational force, and the steam that is formed within the steam generator while removing the heat of the reactor coolant system is circulated to the condensation heat exchanger continuously (Korean Patent Publication No. 10-2013-0047871).

On the other hand, the passive containment cooling system generally uses a method of removing heat within the containment by natural circulation flow formed within the containment without any other flow inducing means. Furthermore, the passive residual heat removal system and passive containment cooling system are typically designed independently.

The performance of the passive containment cooling system in the related art has been determined only by natural circulation flow without any additional devices for forming the flow thereof.

In such a configuration where natural convection is dominant, the heat transfer coefficient on a surface over which the atmosphere (air and steam) flows is very small, thereby causing a problem in which the size of the heat exchanger should be greatly increased. Meanwhile, the heat exchanger may be a structure of forming a pressure boundary of the containment, thus a possibility of the pressure boundary break may increase when the size of the heat exchanger increases, thereby causing a problem of decreasing the safety.

SUMMARY OF THE INVENTION

An object of the present disclosure is to propose a passive safety facility with an enhanced cooling performance within the containment using a facility which can overcome the limitation of the natural circulation, and a nuclear power plant including the same.

Another object of the present disclosure is to provide a passive safety facility capable of performing both functions of a passive residual heat removal system and a passive containment building cooling system, and discharging heat transferred from a reactor coolant system to the external environment, and a nuclear power plant including the same.

Still another object of the present disclosure is to disclose a passive safety facility capable of enhancing a heat transfer performance without increasing a size of the heat exchanger, and a nuclear power plant including the same.

Yet still another object of the present disclosure is to disclose a passive safety facility capable of enhancing circulation flow within the containment to reduce a concentration of radioactive materials within the containment at an early stage, and a nuclear power plant including the same.

Still yet another object of the present disclosure is to provide a passive safety facility capable of collecting radioactive materials to reduce the concentration of the radioactive materials within the containment at an early stage, and a nuclear power plant including the same.

In order to accomplish an object of the foregoing aspects, a passive safety facility associated with an embodiment of the present disclosure may include a cooling section formed to cool a first fluid discharged from a reactor coolant system or steam generator along with a second fluid within a containment; and a circulation inducing jet device formed to jet the first fluid discharged from the reactor coolant system or the steam generator to the cooling section, at least part of which is open toward an inside of the containment to entrain the second fluid by a pressure drop caused while jetting the first fluid so as to jet the entrained second fluid along with the first fluid.

The circulation inducing jet device may include a first fluid jetting section connected to the reactor coolant system or the steam generator to receive the first fluid, and formed to jet the received first fluid; a second fluid entraining section formed in an annular shape around the first fluid jetting section to entrain the second fluid within the containment; and a circulating fluid jetting section configured to surround the first fluid jetting section with a portion having an inner diameter larger than that of the first fluid jetting section to form the second fluid entraining section, and supply the first fluid and the second fluid to the cooling section.

The first fluid jetting section may include a nozzle configured to jet the first fluid to the circulating fluid jetting section, and the circulating fluid jetting section may include a throat formed with an inner diameter smaller than that of an inlet of the nozzle to cause a local pressure drop while jetting the first fluid; and a diffuser configured to induce the first fluid and the second fluid that have passed through the throat to the cooling section.

The circulation inducing jet device may include a turbine blade rotatably installed at an outlet of the first fluid jetting section to induce the jetting of the first fluid; and a pump impeller connected to the turbine blade to rotate along with the turbine blade, and induce the entrainment of the second fluid through the second fluid entraining section.

The passive safety facility may further include a filter facility connected to an outlet of the cooling section to filter out noncondensible gas discharged from the cooling section, and collect radioactive materials filtered out from the noncondensible gas.

The filter facility may include a filter or absorbent configured to separate the radioactive materials from the noncondensible gas; a gas discharge section configured to discharge noncondensible gas filtered out while passing through the filter or absorbent to an inside of the containment; and a gas line connected to the outlet of the cooling section to supply the noncondensible gas to the filter or absorbent.

The cooling section may cool the first fluid and the second fluid to form condensate, and the passive safety facility may further include a cooling water storage section formed to store cooling water therein, and the cooling water storage section may be installed below the cooling section to collect the condensate discharged from the cooling section.

The cooling water storage section may include a first cooling water storage section configured to store pure cooling water to be supplied to the steam generator so as to remove sensible heat within the reactor coolant system and residual heat in a core; and a second cooling water storage section configured to store borated water to be injected into the reactor coolant system so as to maintain a level of the reactor coolant system.

The passive safety facility may further include an additive injection section configured to inject an additive into the condensate for suppressing the revolatilization of condensate collected in the cooling water storage section, and the additive may be formed to maintain a pH of the condensate above a preset value.

The cooling water storage section may be configured to collect the condensate in the first cooling water storage section, and flow the condensate collected in the first cooling water storage section into the second cooling water storage section when a level of the collected condensate exceeds a reference level, and the additive injection section may be installed at a flow path connected from the first cooling water storage section to the second cooling water storage section to inject the additive into the condensate flowing into the second cooling water storage section.

The additive injection section may be installed at a flow path connected from the cooling section to the cooling water storage section to inject the additive to condensate collected in the cooling water storage section.

The passive safety facility may further include a condensate holding section installed between the cooling section and the cooling water storage section to collect the condensate falling from the cooling section so as to return it to the cooling water storage section.

The passive safety facility may further include a return line extended from an outlet of the cooling section or the condensate holding section to the cooling water storage section to return condensate generated during the cooling process of the cooling section to the cooling water storage section.

The passive safety facility may further include a filter facility connected to an outlet of the cooling section to filter out noncondensible gas discharged from the cooling section so as to collect radioactive materials filtered out from the noncondensible gas, and the return line may include a first return line connected to a lower portion of the casing to form a flow path of the condensate collected in the casing; and a second return line connected to a lower portion of the filter facility to form a flow path of the condensate collected in the filter facility.

The passive safety facility may further include a fluid circulation section configured to circulate the cooling water of the cooling water storage section to the circulation inducing jet device through the reactor coolant system or the steam generator, and the fluid circulation section may include a fluid supply line connected to the cooling water storage section to supply cooling water within the cooling water storage section to the reactor coolant system or the steam generator; and a steam discharge line connected to the reactor coolant system or the steam generator and the circulation inducing jet device to supply the first fluid discharged from the reactor coolant system or the steam generator to the circulation inducing jet device.

The cooling section may include a heat exchanger installed within the containment to allow the cooling water of the emergency cooling water storage section or atmosphere outside the containment to pass therethrough so as to exchange heat with the first fluid and the second fluid jetted from the circulation inducing jet device; and a casing configured to surround the heat exchanger to allow at least part thereof to protect the heat exchanger and accommodate the first fluid and the second fluid jetted from the circulation inducing jet device.

The connected line may include a first connected line connected to the emergency cooling water storage section and the heat exchanger to form a flow path for supplying the cooling water of the emergency cooling water storage section to the heat exchanger; a second connected line extended from the heat exchanger to an outside of the containment to discharge the cooling water of the emergency cooling water storage section that has passed through the heat exchanger to an outside thereof; a third connected line branched from the second connected line and extended to an outside of the containment to form a flow path for supplying atmosphere outside the containment to the heat exchanger; and a fourth connected line branched from the first connected line and extended to an outside of the containment to discharge atmosphere heated while passing through the heat exchanger to an outside thereof, wherein the passive safety facility further comprises isolation valves installed at the first connected line through the fourth connected line, respectively, and the isolation valves are open or closed by a preset signal to switch between water-cooled type cooling using the coolant and air-cooled type cooling using the atmosphere when the cooling water of the emergency cooling water storage section is exhausted.

The passive safety facility may further include a filter facility connected to an outlet of the cooling section to filter out noncondensible gas discharged from the cooling section so as to collect radioactive materials filtered out from the noncondensible gas, and the cooling section may include a heat exchanger installed outside the containment to connect to a connected line passing through the containment, and allow the first fluid and the second fluid flowing in from the circulation inducing jet device to pass through the connected line to exchange heat with the cooling water of the emergency cooling water storage section or atmosphere outside the containment, and the filter facility may be installed within the containment, and connected to the heat exchanger by the connected line to receive noncondensible gas and condensate from the heat exchanger.

The cooling section may include a first heat exchanger installed within the containment to cool the first fluid and second fluid jetted from the circulation inducing jet device; and a second heat exchanger installed outside the containment, and connected to the first heat exchanger by a connected line passing through the containment to form a closed flow path to transfer heat that has transferred to a fluid circulating the closed flow path to cooling water within the emergency cooling water storage section or atmosphere outside the containment.

The containment may include a containment vessel formed of steel to surround the reactor coolant system; and a containment building formed of concrete to surround the containment vessel at a position separated from the containment vessel to form an air circulating flow path, and the circulation inducing jet device may be configured to jet the first fluid and the second fluid to an inner wall surface of the containment vessel, and the cooling section may cool the containment vessel using air that circulates through the air circulating flow path and the spraying of a passive containment vessel spray system.

According to the present disclosure having the foregoing configuration, it may be possible to promote natural circulation using a circulation inducing jet device to increase an efficiency of cooling an inside of the containment, thereby overcoming the technical limitation of the related art depending on natural circulation within the containment.

Furthermore, the present disclosure may induce the second fluid within the containment at the same time to the heat exchanger by the discharge flow of the first fluid, thereby solving the problems of size increase, cost increase and safety degradation in the heat exchanger for cooling the containment in a nuclear power plant.

In addition, the present disclosure may reduce a concentration of radioactive materials within the containment at an early stage using a filter facility. As the concentration of radioactive materials is reduced, the present disclosure may decrease the exclusion area boundary.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
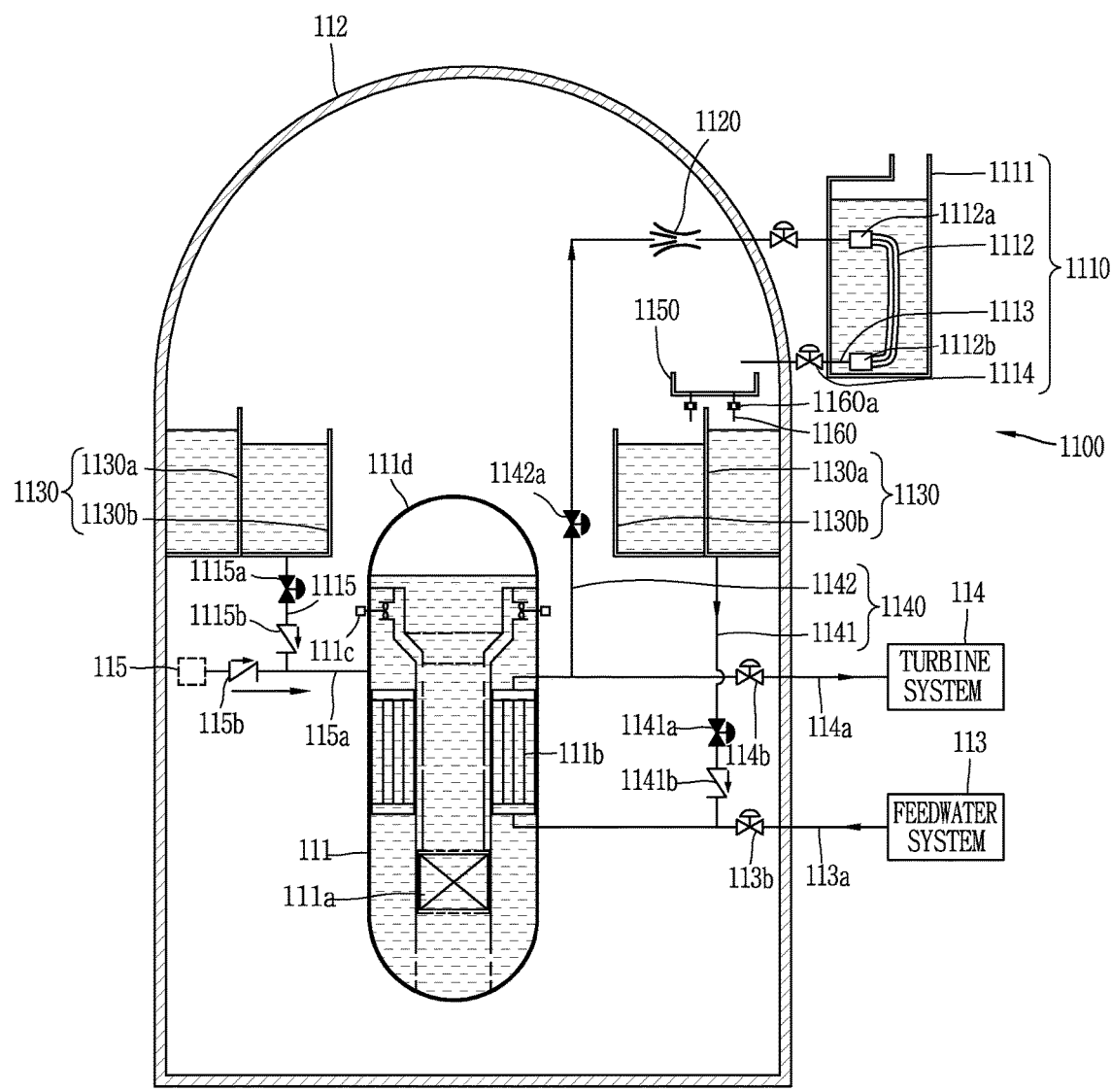
FIG. 1 is a conceptual view illustrating when a normal operation is carried out on a passive safety facility and a nuclear power plant including the same associated with an embodiment of the present disclosure.

Hereinafter, a passive safety facility and a nuclear power plant including the same associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

FIG. 1 is a conceptual view illustrating when a normal operation is carried out on a passive safety facility 1100 and a nuclear power plant 110 including the same associated with an embodiment of the present disclosure.

The nuclear power plant 110 may include a reactor coolant system 111, a containment 112 and a passive safety facility 1100.

A core 111a and a steam generator 111b are provided within the reactor coolant system 111, and a lower portion of the steam generator 111b is connected to a feedwater system 113 by a feedwater line 113a, and an upper portion of the steam generator 111b is connected to a turbine system 114 by a steam line 114a.

The containment 112 surrounds the reactor coolant system 111 to prevent radioactive materials from being leaked to an external environment. During the occurrence of an accident, such as a loss of coolant accident or non-loss of coolant accident, there is a concern of leaking radioactive materials from the reactor coolant system 111, and thus the containment 112 is formed to surround the reactor coolant system 111 outside the reactor coolant system 111 to prevent the leakage of radioactive materials.

The containment 112 performs the role of a final barrier for preventing the leakage of radioactive materials to an external environment from the reactor coolant system 111. The containment 112 is divided into a containment building (or reactor building) configured with reinforced concrete and a containment vessel and a safeguard vessel configured with a steel vessel according to a material constituting a pressure boundary. The containment vessel is a large vessel designed at a low pressure such as a containment building, and the safeguard vessel is a small vessel designed in a small size at an increased design pressure. According to the present disclosure, unless otherwise noted, the containment 112 commonly refers to a containment building, a reactor building, a containment vessel, a safeguard vessel or the like. The containment 112 illustrated in FIG. 1 is illustrated as a containment building formed with reinforced concrete.

Various fluids for maintaining the safety of the nuclear power plant 110 exist within the containment 112. A fluid for cooling the core 111a is filled in the reactor coolant system 111. Furthermore, fluids for making preparations for various accidents are also filled within the containment 112. Hereinafter, it will be described that among fluids within the containment 112, a fluid discharged from the reactor coolant system 111 and a fluid existing in a space between the reactor coolant system 111 and the containment 112 are divided into a first fluid and a second fluid, respectively. However, such a division of fluids is irrelevant to the properties of a fluid or materials constituting a fluid. Accordingly, the first fluid and second fluid may be the same type of fluid.

The passive safety facility 1100 is configured to circulate a fluid to the reactor coolant system 111 so as to remove the heat of the reactor coolant system 111 using a primary cooling water circulation method or secondary cooling water circulation method, and cool a first fluid discharged from the reactor coolant system 111 and a second fluid within the containment 112 at the same time to discharge heat within the containment 112 to an external environment. The passive safety facility 1100 is configured to increase a heat and pressure reduction efficiency within the containment 112 and a removal efficiency of radioactive materials in a passive method using a structure formed to accelerate circulation flow by getting out of a conventional method using pure natural convection flow that occurs within the containment 112.

The passive safety facility 1100 may include a cooling section 1110 and a circulation inducing jet device 1120.

The cooling section 1110 is formed to cool a first fluid discharged from the reactor coolant system 111 along with a second fluid within the containment 112. The cooling section 1110 is configured to discharge heat received from the first fluid and second fluid to an external environment as the first fluid and second fluid are cooled, and return the cooled first fluid and second fluid to a cooling water storage section 1130.

The cooling section 1110 may include an emergency cooling water storage section 1111 and a heat exchanger 1112.

The emergency cooling water storage section 1111 is formed to store cooling water therein, and receives heat from the first fluid and second fluid, and when the temperature of the cooling water increases, the emergency cooling water storage section 1111 evaporates the cooling water to discharge the received heat to an external environment. At least part of an upper portion of the emergency cooling water storage section 1111 is open to allow cooling water to be evaporated to an external environment.

The heat exchanger 1112 is installed within the emergency cooling water storage section 1111, and connected to a connected line 1113 passing through the containment 112 to communicate with an inside of the containment 112. The heat exchanger 1112 allows a fluid flowing in from the containment 112 through the connected line 1113 to pass therethrough so as to exchange heat with cooling water stored within the emergency cooling water storage section 1111. A fluid flowing in from the containment 112 through the connected line 1113 may include a first fluid discharged from the reactor coolant system 111 and a second fluid within the containment 112. According to the characteristics of the nuclear power plant 110, the cooling section 1110 may be configured with an air-cooled type by exposing the heat exchanger 1112 to atmosphere and installing a duct (not shown) without installing the emergency cooling water storage section 1111.

An inlet header 1112a for distributing the first fluid and second fluid to an internal flow path of the heat exchanger 1112 is installed at an inlet of the heat exchanger 1112. An outlet header 1112b for collecting heated cooling water from the internal flow path is installed at an outlet of the heat exchanger 1112.

The connected line 1113 connects an inside of the containment 112 and the heat exchanger 1112 through the containment 112 and the emergency cooling water storage section 1111. At least one isolation valve 1114 for closing and isolating the isolation valve 1114 when the system is damaged during an accident or switching at the time point when the maintenance is required may be installed at the connected line 1113.

The circulation inducing jet device 1120 is formed to jet the first fluid and second fluid to the cooling section 1110. The second fluid within the containment 112 is entrained and jetted along with the first fluid by a pressure drop caused while jetting the first fluid. The detailed structure and operation mechanism of the circulation inducing jet device 1120 will be described with reference to FIG. 2.

Figure 2:
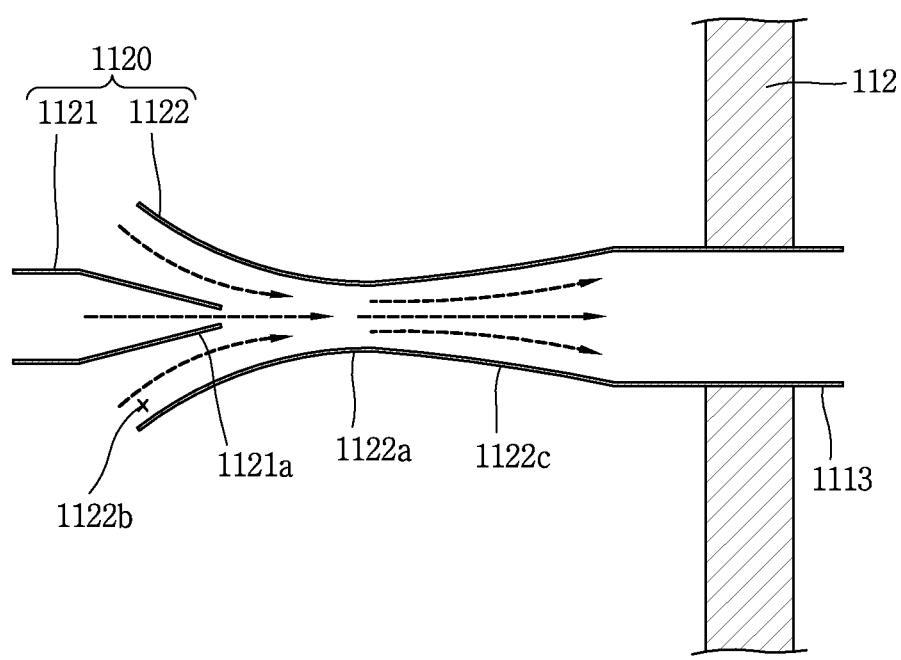
FIG. 2 is an enlarged conceptual view illustrating a circulation inducing jet device illustrated in FIG. 1.

FIG. 2 is an enlarged conceptual view illustrating the circulation inducing jet device 1120 illustrated in FIG. 1.

The circulation inducing jet device 1120 may include a first fluid jetting section 1121, a second fluid entraining section 1122b, and a circulating fluid jetting section 1122.

The first fluid jetting section 1121 is connected to the reactor coolant system 111 (refer to FIG. 1) or the steam generator 111b to jet a first fluid provided from the reactor coolant system 111 or the steam generator 111b. The first fluid jetting section 1121 may be connected to the steam generator 111b to receive the first fluid from the steam generator 111b as illustrated in FIG. 1.

The first fluid jetting section 1121 may include a nozzle 1121a formed to jet the first fluid. The first fluid discharged through the nozzle 1121a rapidly increases the speed thereof, and decreases the pressure thereof while passing through a throat 1122a with a small flow path area. Accordingly, a pressure drop is locally caused within the circulation inducing jet device 1120.

The second fluid entraining section 1122b is formed in an annular shape around the first fluid jetting section 1121 to entrain the second fluid within the containment. A pressure difference is formed between an inside and an outside of the circulation inducing jet device 1120 by a pressure drop caused by the jetting of the first fluid. Since a pressure within the circulation inducing jet device 1120 is lower than that of the outside thereof, the second fluid existing outside the circulation inducing jet device 1120 is entrained into the circulation inducing jet device 1120 through the second fluid entraining section 1122b.

The circulating fluid jetting section 1122 as a portion having an inner diameter larger than that of the first fluid jetting section 1121 to form the second fluid entraining section 1122b surrounds the first fluid jetting section 1121. Accordingly, the second fluid entraining section 1122b having an annular shape is formed between an outer circumferential surface of the first fluid jetting section 1121 and an inner circumferential surface of the circulating fluid jetting section 1122.

The circulation inducing jet device 1120 supplies the first fluid and second fluid to the cooling section 1110 at the same time. The circulation inducing jet device 1120 may include a throat 1122a and a diffuser 1122c.

The throat 1122a is formed with an inner diameter smaller than that of the surroundings to cause a local pressure drop during the jetting of the first fluid. As illustrated in FIG. 2, the throat 1122a has an inner diameter smaller than that of the second fluid entraining section 1122b and diffuser 1122c.

The diffuser 1122c naturally induces the first fluid and second fluid to the cooling section 1110 without generating a large pressure loss to the first fluid and second fluid that have passed through the throat 1122a. If the flowing of the first fluid and second fluid that have passed through the throat 1122a is not naturally diffused, a flow path resistance may increase to decrease circulation flow. The diffuser 1122c decreases a flow path resistance by naturally changing a dynamic pressure to a static pressure to efficiently supply the first fluid and second fluid to the cooling section 1110.

As illustrated in FIG. 2, the throat 1122a and the diffuser 1122c are sequentially connected to each other. The inner diameter thereof is formed to gradually decrease as moving from the second fluid entraining section 1122b to the throat 1122a, and increase again as moving from the throat 1122a to the diffuser 1122c.

The circulating fluid jetting section 1122 is connected to the connected line 1113 passing through the containment 112. The circulating fluid jetting section 1122 jets the first fluid and second fluid to an inside of the connected line 1113. The jetted first fluid and second fluid exchanges heat with cooling water within the emergency cooling water storage section 1111 while passing through the heat exchanger 1112.

Due to such a structural feature of the circulation inducing jet device 1120, the present disclosure may overcome the limitation of the related art depending on pure natural convection within the containment 112, and promote the circulation flow of the first fluid and second fluid to enhance cooling efficiency within the containment 112.

Referring to FIG. 1 again, the passive safety facility 1100 may include a cooling water storage section 1130, a fluid circulation section 1140, a condensate holding section 1150 and a return line 1160.

The cooling water storage section 1130 is formed to store cooling water to be injected into the reactor coolant system 111 therein. The cooling water storage section 1130 is installed at a position higher than that of the reactor coolant system 111 to allow the injection of cooling water due to a gravity water head.

According to the present disclosure, the passive safety system 1110 collectively refers to i) a function of a passive residual heat removal system and ii) a latter safety injection function of a passive safety injection system. The cooling water circulation method of the passive safety system 1110 may use a secondary cooling water circulation method using the steam generator 111b and a primary cooling water circulation method for directly injecting cooling water to the reactor coolant system 111. Cooling water stored in the cooling water storage section 1130 may be used for at least one of the residual heat removal of the reactor coolant system 111 and safety injection to the reactor coolant system 111 according to the usage.

Since sensible heat and residual heat generated from the core 111a exist within the reactor coolant system 111 during the occurrence of an accident, the sensible heat and residual heat should be removed to safely maintain the core 111a. A method of circulating cooling water to the steam generator 111b to remove sensible heat within the reactor coolant system 111 and residual heat in the core 111a is applied to the embodiment of FIG. 1. The cooling water storage section 1130 may be connected to the feedwater line 113a to use cooling water stored therein for the removal of residual heat.

Furthermore, since a water level of the reactor coolant system 111 decreases during the occurrence of an accident, cooling water should be injected into the reactor coolant system 111 to maintain the water level. The cooling water storage section 1130 may be connected to the safety injection line 115a by a line 1115 to use cooling water stored therein for safety injection.

The cooling water storage section 1130 may be separately provided with a first cooling water storage section 1130a and a second cooling water storage section 1130b to store pure cooling water to be used for residual heat removal and borated water to be used for safety injection, respectively, in a separate manner as illustrated in FIG. 1.

The first cooling water storage section 1130a stores pure cooling water to be supplied to the steam generator 111b to remove sensible heat within the reactor coolant system 111 and residual heat in the core 111a. The second cooling water storage section 1130b stores borated water to be directly injected into the reactor coolant system 111 to maintain the water level of the reactor coolant system 111.

The fluid circulation section 1140 is formed to circulate the first fluid from the cooling water storage section 1130 to the circulation inducing jet device 1120 through the reactor coolant system 111 or the steam generator 111b. The fluid circulation section 1140 may include a fluid supply line 1141 and a steam discharge line 1142.

The fluid supply line 1141 is connected to the cooling water storage section 1130 to supply cooling water within the cooling water storage section 1130 to the reactor coolant system 111 or steam generator 111b. The fluid supply line 1141 may be directly or indirectly connected to the reactor coolant system 111. The fluid supply line 1141 may be connected to the feedwater line 113a to supply cooling water to the steam generator 111b within the reactor coolant system 111 as illustrated in the drawing.

The steam discharge line 1142 is connected to the circulation inducing jet device 1120 to supply the first fluid that has passed through the reactor coolant system 111 or steam generator 111b to the circulation inducing jet device 1120. The steam discharge line 1142 may supply is connected to the steam generator 111b to supply the first fluid discharged from the steam generator 111b to the circulation inducing jet device 1120 as illustrated in the drawing.

The condensate holding section 1150 collects condensate formed by cooling the first fluid and second fluid in the cooling section 1110. At least part of an upper portion of the condensate holding section 1150 is open to collect condensate falling from the cooling section 1110 and installed between the cooling section 1110 and the cooling water storage section 1130.

The return line 1160 is extended from the condensate holding section 1150 to the cooling water storage section 1130 to return condensate collected in the condensate holding section 1150 again to the cooling water storage section 1130. A flow regulator 1160a for controlling the flow of the condensate may be installed at the return line 1160.

When the condensate is collected in the condensate holding section 1150, and returned to the cooling water storage section 1130 through the return line 1160, the circulation of flow started from the cooling water storage section 1130 is completed. The present disclosure induces the circulation of flow in a passive method by natural forces, and thus the circulation of flow does not end by one circulation. The circulation of flow may continue to be sustained while a sufficient passive force capable of inducing the circulation of flow within the containment 112 is maintained by generating steam from the reactor coolant system 111 or steam generator 111b.

Hereinafter, the operation of the passive safety facility 1100 and the nuclear power plant 110 including the same during the occurrence of an accident will be described.

Figure 3:
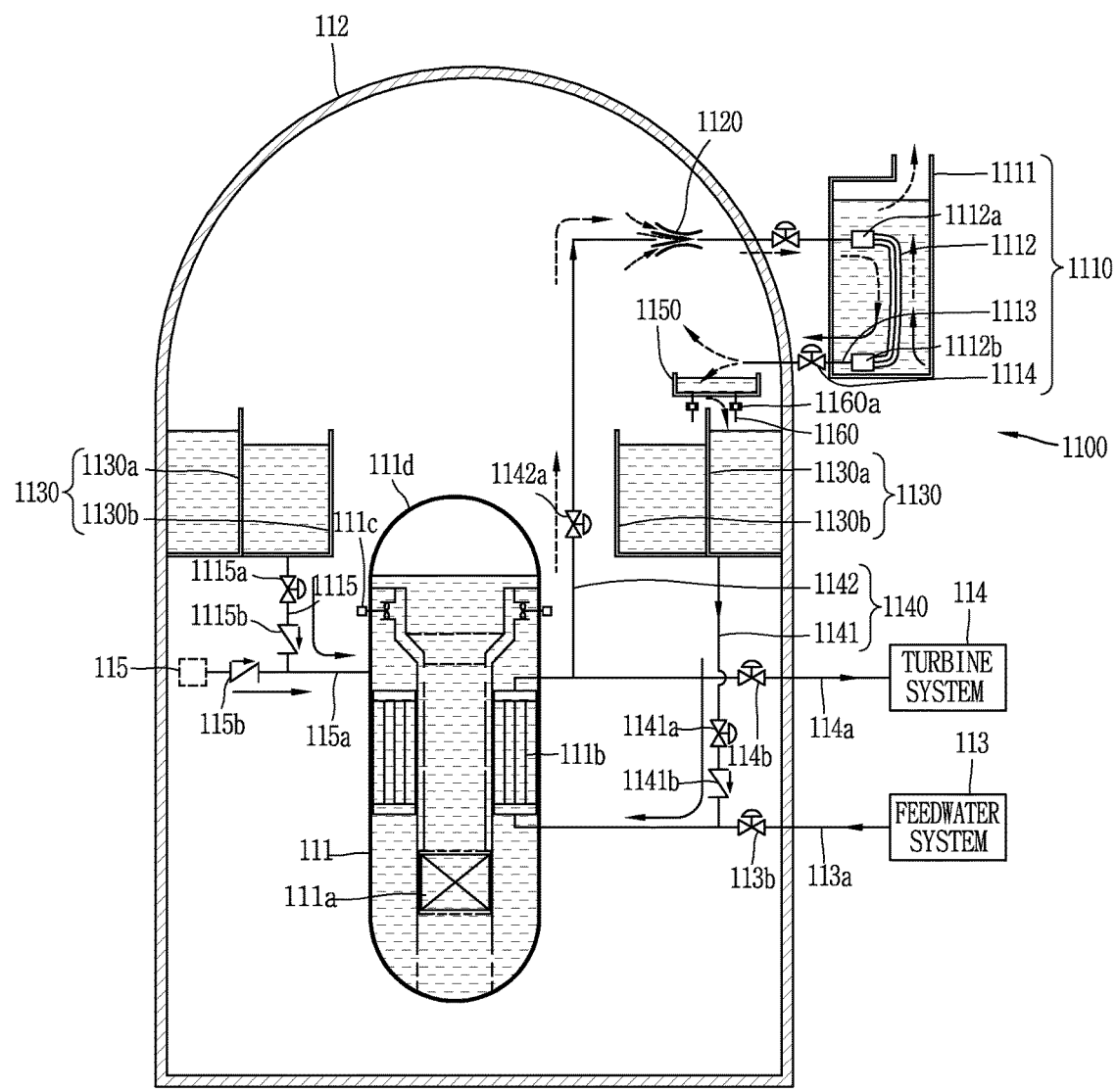
FIG. 3 is a conceptual view illustrating when an event occurs on a passive safety facility and a nuclear power plant including the same illustrated in FIG. 1.

FIG. 3 is a conceptual view illustrating when an event occurs on the passive safety facility 1100 and the nuclear power plant 110 including the same illustrated in FIG. 1.

When an accident such as a loss of coolant accident occurs, isolation valves 113b, 114b installed at the feedwater line 113a and steam line 114a, respectively, are closed. Then, valves 115b installed at the safety injection line 115a are open to implement safety injection from the safety injection facility 115 to the reactor coolant system 111. When an internal pressure of the reactor coolant system 111 decreases as the isolation valve 1115a and check valve 1115b installed at the line 1115 connected to the safety injection line 115a are open, borated water stored in the second cooling water storage section 1130b is also injected into the reactor coolant system 111 by a gravity water head. The borated water stored in the second cooling water storage section 1130b performs the role of maintaining a water level within the reactor coolant system 111 along with the safety injection facility 115.

The isolation valve 1141a and check valve 1141b installed at the fluid supply line 1141 for connecting the first cooling water storage section 1130a to the feedwater line 113a are also open to start the supply of cooling water due to a gravity water head. The cooling water of the first cooling water storage section 1130a is supplied to a lower portion of the steam generator 111b through the feedwater line 113a to remove sensible heat within the reactor coolant system 111 and residual heat in the core 111a in the steam generator 111b, and is discharged to an upper portion of the steam generator 111b.

The isolation valve 1142a installed at the steam discharge line 1142 is also open, and the first fluid discharged to an upper portion of the steam generator 111b is evaporated through the steam discharge line 1142. The first fluid is supplied to the circulation inducing jet device 1120, and the circulation inducing jet device 1120 jets the first fluid supplied through the steam discharge line 1142 and the second fluid entrained from an inside of the containment 112 by a pressure drop to the connected line 1113.

The first fluid and second fluid jetted from the circulation inducing jet device 1120 transfer heat cooling water within the emergency cooling water storage section 1111 while passing through the heat exchanger 1112, and cool and condense. The cooling water within the emergency cooling water storage section 1111 evaporates and discharges heat to an external environment when the temperature increases.

The condensate formed by cooling and condensing the first fluid and second fluid in the heat exchanger 1112 is injected into the containment 112 again through the connected line 1113, and collected into the condensate holding section 1150 installed at a lower portion of the connected line 1113. Noncondensible gas discharged along with condensate from the connected line 1113 is discharged into the containment 112. The condensate collected in the condensate holding section 1150 is returned to the cooling water storage section 1130 again through the return line 1160, and the circulation of flow is carried out in a continuous and consistent manner. However, when it is configured to directly collect condensate into the cooling water storage section 1130 according to the characteristics of the nuclear power plant 110, the condensate holding section 1150 may not be separately provided therein.

Hereinafter, another embodiment of a passive safety facility and a nuclear power plant including the same will be described.

Figure 4:
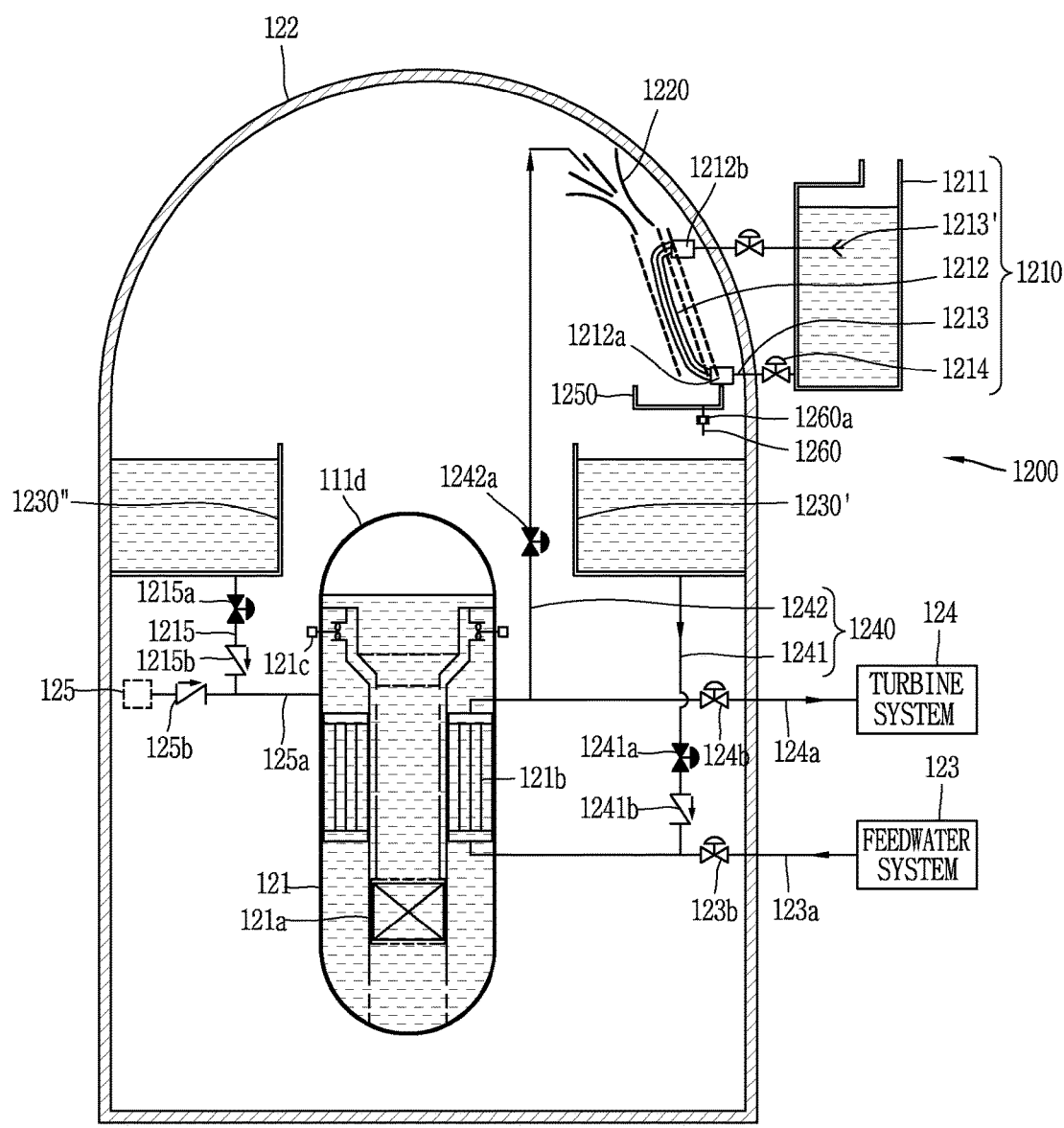
FIG. 4 is a conceptual view illustrating when a normal operation is carried out on a passive safety facility and a nuclear power plant including the same associated with another embodiment of the present disclosure.

FIG. 4 is a conceptual view illustrating when a normal operation is carried out on a passive safety facility 1200 and a nuclear power plant 120 including the same associated with another embodiment of the present disclosure.

The passive safety facility 1200 may include a cooling section 1210 and a circulation inducing jet device 1220.

The passive safety facility 1200 may include a cooling section 1210 and a circulation inducing jet device 1220.

An emergency cooling water storage section 1211 is installed outside the containment 122, and cooling water is stored therein. A heat exchanger 1212 is installed within the containment 122 other than an inside of the emergency cooling water storage section 1211, and connected to the emergency cooling water storage section 1211 by a connected line 1213 passing through the containment 122. A sparger 1213' for jetting cooling water may be installed at an end portion of the connected line 1213. The heat exchanger 1212 is configured to allow cooling water within the emergency cooling water storage section 1211 to pass therethrough so as to exchange heat with the first fluid and second fluid jetted from the circulation inducing jet device 1220. However, a duct (not shown) may be installed to configure the nuclear power plant 120 in an air-cooled type without installing the emergency cooling water storage section 1211 according to the characteristics of the nuclear power plant 120.

The structure and operation of the circulation inducing jet device 1220 illustrated in FIG. 4 will be described with reference to FIGS. 5A and 5B.

Figure 5A:
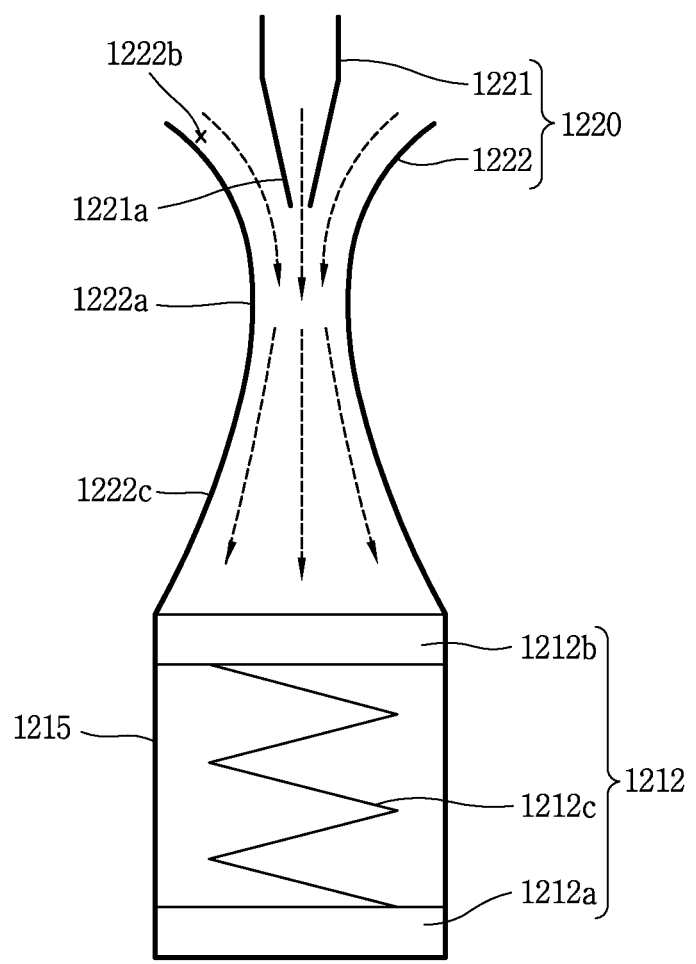
FIGS. 5A and 5B are enlarged conceptual views illustrating a circulation inducing jet device illustrated in FIG. 4.
Figure 5B:
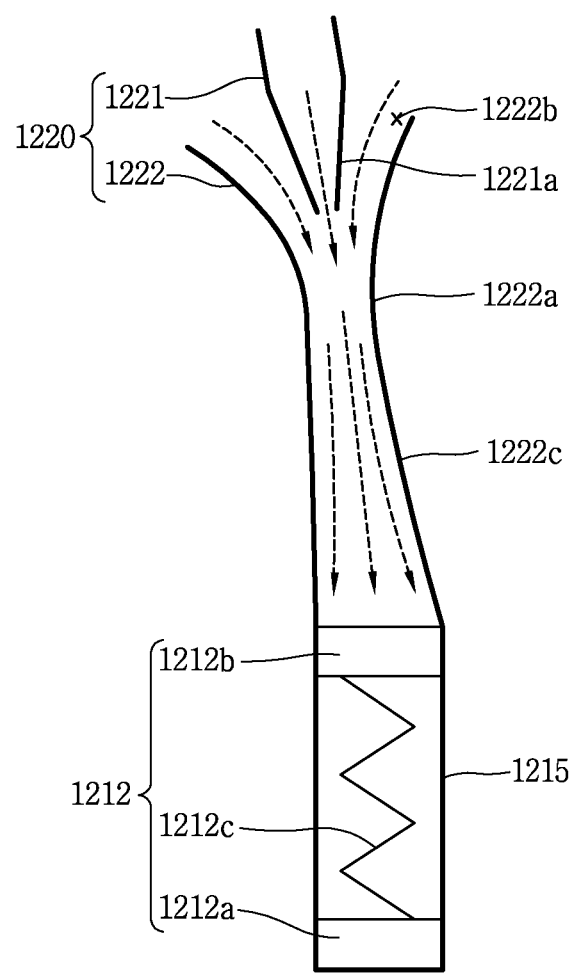

FIGS. 5A and 5B are enlarged conceptual views illustrating the circulation inducing jet device 1220 illustrated in FIG. 4. FIG. 5A is a conceptual view in which the circulation inducing jet device 1220 is seen from a front side, and FIG. 5B is a conceptual view in which the circulation inducing jet device 1220 is seen from a lateral side.

A circulating fluid jetting section 1222 jets the first fluid and second fluid to the heat exchanger 1212. The jetted first fluid and second fluid exchange heat with cooling water in the heat exchanger 1212.

An inlet header 1212a for distributing cooling water supplied from the emergency cooling water storage section 1211 (refer to FIG. 4) to an internal flow path of the heat exchanger 1212 is installed at an inlet of the heat exchanger 1212. An outlet header 1212b for collecting heated cooling water from the internal flow path is installed at an outlet of the heat exchanger 1212. A tube 1212c is installed between the inlet header 1212a and the outlet header 1212b. A casing 1215 for protecting the tube 1212c from missiles (fragments) during an accident is installed on a circumference of the tube 1212c.

The circulation inducing jet device 1220 is formed to jet the first fluid and second fluid to a surface of the heat exchanger 1212. However, when a shell-and-tube type heat exchanger is employed according to the design characteristics of the nuclear power plant 120, shell and tube side flow paths may be configured in an opposite manner. The first fluid and second fluid jetted from the circulation inducing jet device 1220 are cooled and condensed by exchanging heat with the cooling water of the emergency cooling water storage section 1211 while passing through the internal flow path of the heat exchanger 1212.

Referring to FIG. 4 again, the passive safety facility 1200 may include a cooling water storage section 1230', 1230".

The cooling water storage section 1230', 1230" may be formed with a tank or cistern in which a first cooling water storage section and a second cooling water storage section are integrally formed without including the first cooling water storage section and the second cooling water storage section in a separate manner. A plurality of cooling water storage sections 1230', 1230" may be provided therein, and any part of the cooling water storage section 1230' may be connected to the feedwater line 123a, and another part of the cooling water storage section 1230" may be connected to the safety injection line 125a.

Hereinafter, the operation of the passive safety facility 1200 and the nuclear power plant 120 including the same as illustrated in FIG. 4 during the occurrence of an accident will be described.

Figure 6:
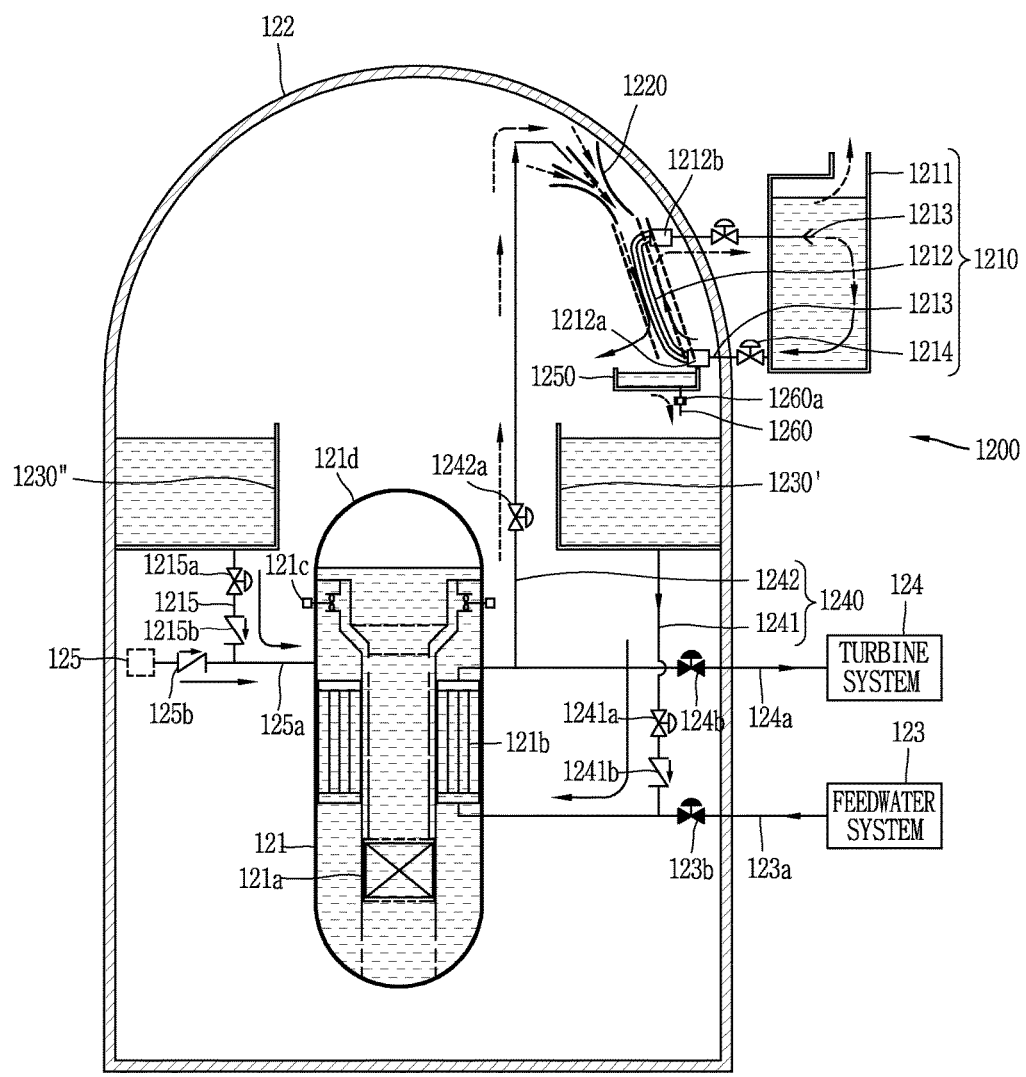
FIG. 6 is a conceptual view illustrating when an event occurs on a passive safety facility and a nuclear power plant including the same illustrated in FIG. 4.

FIG. 6 is a conceptual view illustrating when an event occurs on the passive safety facility 1200 and the nuclear power plant 120 including the same illustrated in FIG. 4.

When an accident occurs on the nuclear power plant 120, isolation valves 123b, 124b installed at the feedwater line 123a and steam line 124a, respectively, are closed. Then, an isolation valve 1241a and a check valve 1241b installed at a fluid supply line 1241 are open. An isolation valve 1215a and a check valve 1251b installed at a line 1215 for connecting between a cooling water storage section 1230" and a safety injection line 125a are also open.

The cooling water of the cooling water storage section 1230" is safely injected into a reactor coolant system 121 along with the cooling water of the safety injection facility 125. The cooling water of the cooling water storage section 1230' is supplied to a steam generator 121b through the fluid supply line 1241 to remove sensible heat within the reactor coolant system 121 and residual heat in the core 121a.

The first fluid discharged from the steam generator 121b is evaporated through a steam discharge line 1242 in which an isolation valve 1242a is open, and supplied to the circulation inducing jet device 1220. The first fluid is jetted to the heat exchanger 1212 by the circulation inducing jet device 1220. The second fluid is also entrained into the circulation inducing jet device 1220 and jetted to the heat exchanger 1212 along with the first fluid. The first fluid and second fluid exchange heat with cooling water supplied from the emergency cooling water storage section 1211 on a surface of the heat exchanger 1212, and cool and condense. Then, condensate formed by condensing the first fluid and second fluid falls by gravity.

The falling condensate is collected into a condensate holding section 1250, and returned to the cooling water storage section 1230 through a return line 1260, and the circulation of flow is consistently carried out.

Hereinafter, still another embodiment of a passive safety facility and a nuclear power plant including the same will be described.

Figure 7:
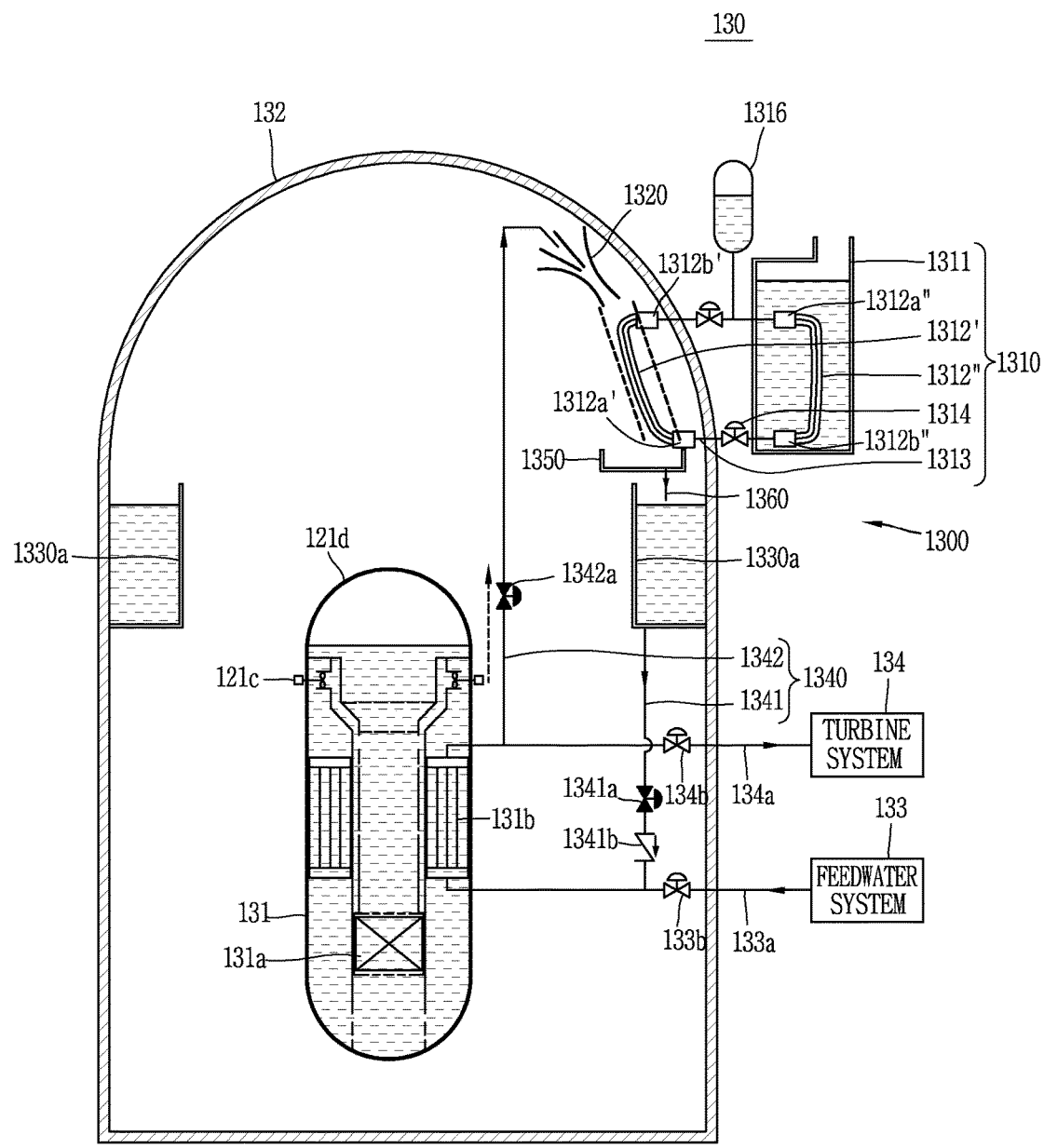
FIG. 7 is a conceptual view illustrating when a normal operation is carried out on a passive safety facility and a nuclear power plant including the same associated with still another embodiment of the present disclosure.

FIG. 7 is a conceptual view illustrating when a normal operation is carried out on a passive safety facility 1300 and a nuclear power plant 130 including the same associated with still another embodiment of the present disclosure.

The passive safety facility 1300 may include a cooling section 1310 and a circulation inducing jet device 1320.

The passive safety facility 1300 may include an emergency cooling water storage section 1311, a first heat exchanger 1312' and a second heat exchanger 1312".

The description of the emergency cooling water storage section 1311 will be substituted by the earlier description of FIGS. 1 and 4.

The heat exchanger 1312' is installed within a containment 132 to exchange heat a fluid within the containment 132.

The second heat exchanger 1312" is installed within the emergency cooling water storage section 1311, and connected to the first heat exchanger 1312' by a connected line 1313 to form a closed flow path with the second heat exchanger 1312". A fluid circulates within the closed flow path independently from cooling water within the emergency cooling water storage section 1311 or a fluid within the containment 132. The second heat exchanger 1312" transfers heat transferred to a fluid that circulates the closed flow path in the first heat exchanger 1312' to cooling water within the emergency cooling water storage section 1311. The heat transferred to the emergency cooling water storage section 1311 is discharged to an external environment by the evaporation of cooling water.

The connected line 1313 is connected to the first heat exchanger 1312' and the second heat exchanger 1312", respectively, through the containment 132 and emergency cooling water storage section 1311. A makeup tank 1316 is formed to store a makeup fluid therein, and connected to the connected line 1313 to make up the makeup fluid to the closed flow path.

A first cooling water storage section 1330a may be used for the purpose of removing sensible heat within a reactor coolant system 131 and residual heat in a core 131a, and a safety injection facility (not shown) may be separately provided from the first cooling water storage section 1330a.

Figure 8:
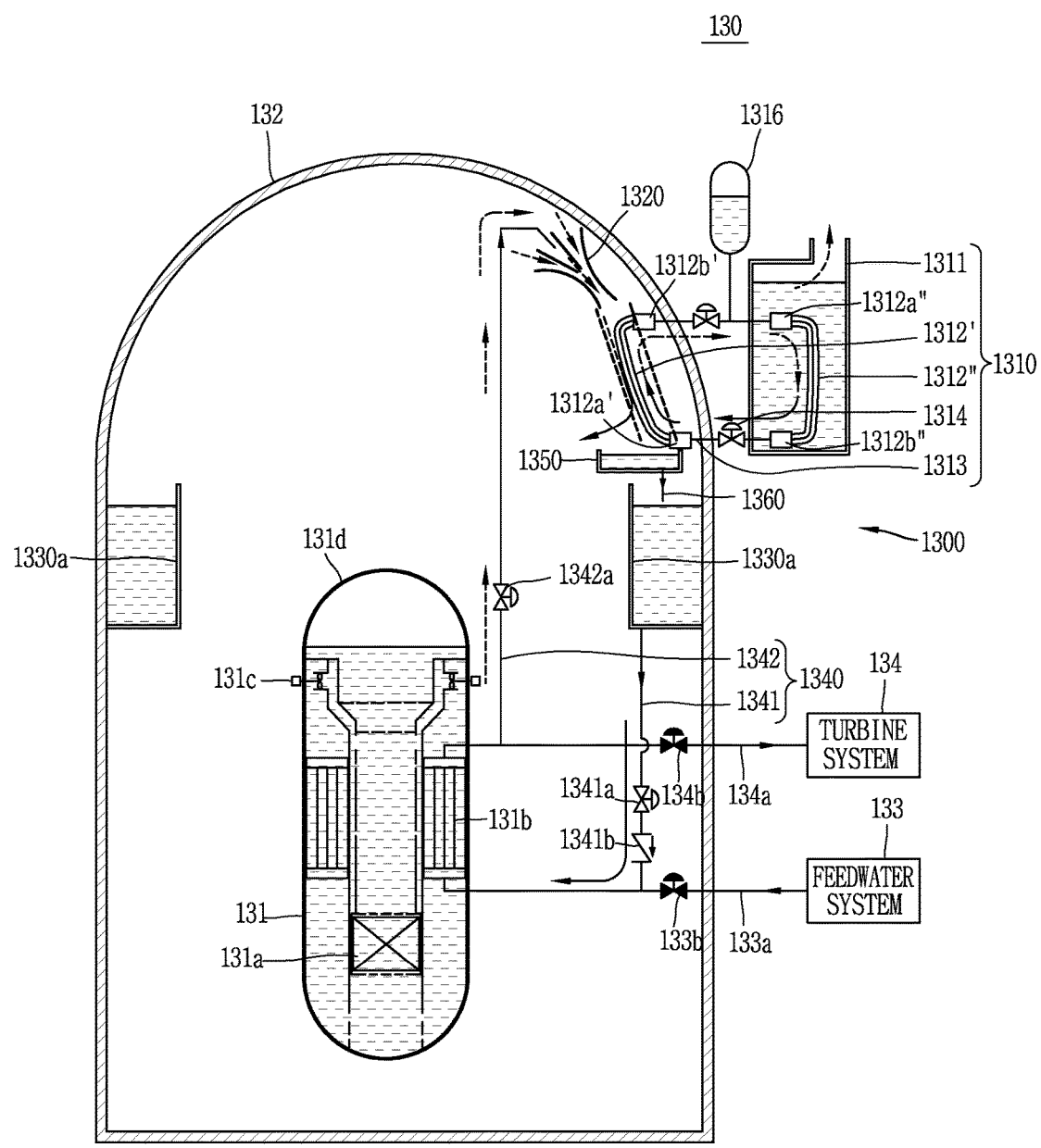
FIG. 8 is a conceptual view illustrating when an event occurs on a passive safety facility and a nuclear power plant including the same illustrated in FIG. 7.

FIG. 8 is a conceptual view illustrating when an event occurs on a passive safety facility 1300 and a nuclear power plant 130 including the same illustrated in FIG. 7.

When an accident occurs on the nuclear power plant 130, isolation valves 133b, 134b installed at the feedwater line 133a and steam line 134a, respectively, are closed.

Furthermore, an isolation valve 1341a and a check valve 1341b installed at the fluid supply line 1341 are open to supply cooling water to a steam generator 131b. Cooling water supplied to the steam generator 131b is evaporated by receiving sensible heat and residual heat. The first fluid discharged from the steam generator 131b is supplied to the circulation inducing jet device 1320 through the steam discharge line 1342.

The circulation inducing jet device 1320 jets the first fluid supplied through the steam discharge line 1342 and the second fluid entrained from the containment 132 to a surface of the first heat exchanger 1312'. The first fluid and second fluid jetted to a surface of the first heat exchanger 1312' exchange heat with cooling water flowing through an inside of the closed flow path formed by the first heat exchanger 1312', the second heat exchanger 1312" and the connected line 1313 to cool and condense, and falls as condensate. The falling condensate is collected into a condensate holding section 1350.

A fluid flowing through an inside of the closed flow path receives heat from an inside of the containment 132 while persistently circulating the closed flow path, and transfers the received heat to cooling water within an emergency cooling water storage section 1311. When a fluid within the closed flow path is insufficient, a makeup fluid is made up from the makeup tank 1316 to continue the circulation. Cooling water within the emergency cooling water storage section 1311 increases the temperature as receiving heat, and evaporates to discharge heat to an external environment.

Hereinafter, a passive safety facility 1400 and a nuclear power plant 140 including the same according to yet still another embodiment of the present disclosure will be described.

Figure 9:
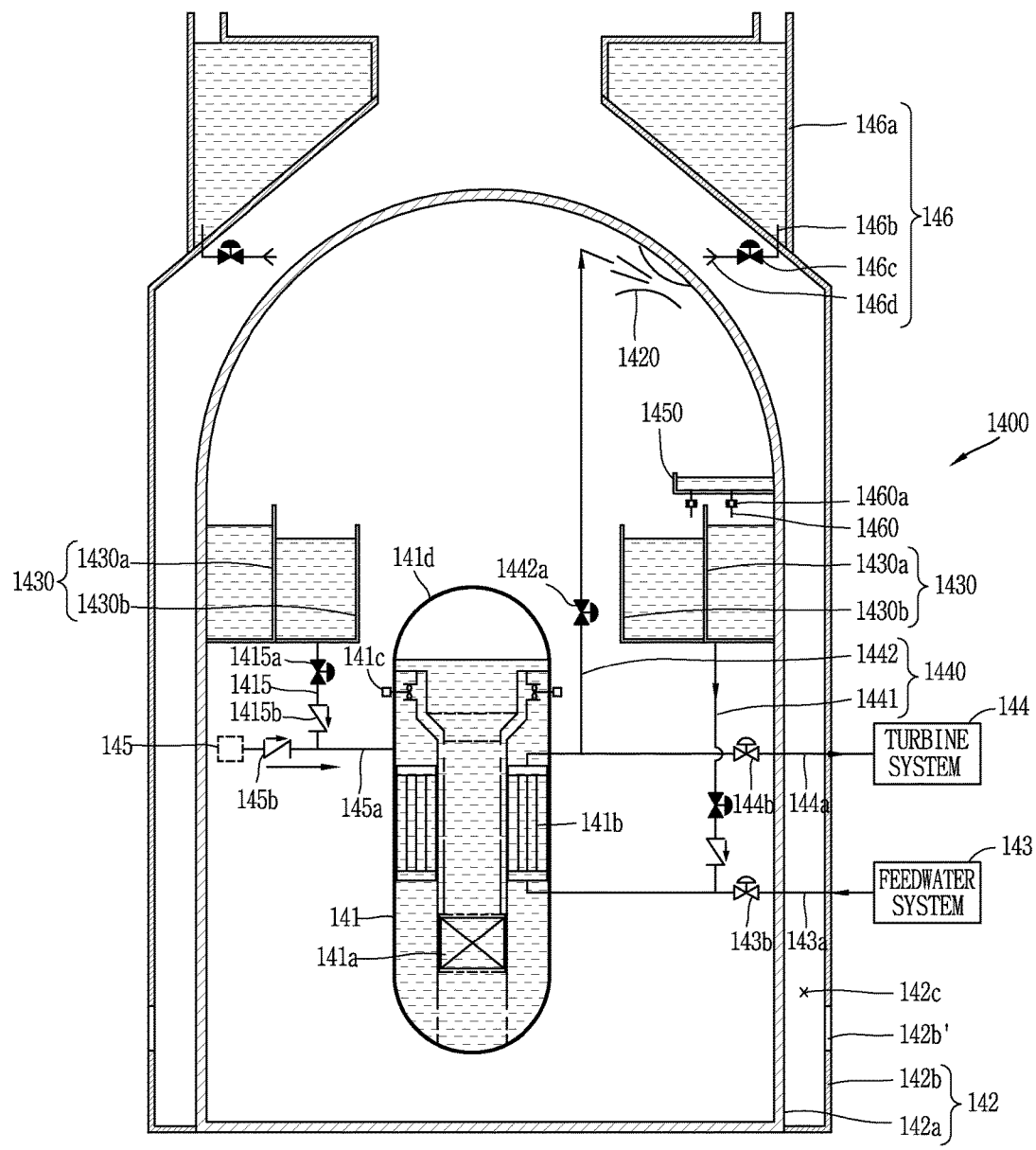
FIG. 9 is a conceptual view illustrating when a normal operation is carried out on a passive safety facility and a nuclear power plant including the same associated with yet still another embodiment of the present disclosure.

FIG. 9 is a conceptual view illustrating when a normal operation is carried out on a passive safety facility 1400 and a nuclear power plant 140 including the same associated with yet still another embodiment of the present disclosure.

The nuclear power plant 140 may include a reactor coolant system 141, a containment 142, a passive containment vessel spray system 146, and a passive safety facility 1400.

The containment 142 may include a containment vessel 142a and a containment building 142b contrary to the foregoing containment.

The containment vessel 142a formed of steel, and formed to surround the reactor coolant system 141. The containment building 142b is formed of concrete, and formed to surround the containment vessel 142a at a position separated from the containment vessel 142a so as to form an air circulation flow path 142c between the containment vessel 142a and the containment building 142b. The containment building 142b may include at least one air inlet 142b' to flow external air for cooling the containment vessel 142a thereinto while circulating the air circulation flow path 142c.

The passive containment vessel spray system 146 may include a spray cooling water storage section 146a, a spray line 146b, a spray isolation valve 146c and a spray nozzle 146d.

The spray cooling water storage section 146a is formed to store cooling water, and installed at an upper portion of the containment building 142b. The spray line 146b may form a flow path to flow the cooling water of the spray cooling water storage section 146a, and the spray isolation valve 146c may be installed at the spray line 146b. Furthermore, the spray nozzle 146d may be installed at an end portion of the spray line 146b. The passive containment vessel spray system 146 sprays cooling water to an outer surface of the containment vessel 142a to cool the containment vessel 142a.

The passive safety facility 1400 may include a cooling water storage section 1430 and a circulation inducing jet device 1420.

The cooling water storage section 1430 may include a first cooling water storage section 1430a and a second cooling water storage section 1430b.

The first cooling water storage section 1430a is connected to a feedwater line 143a to inject cooling water into a steam generator 141b. The first fluid discharged from the steam generator 141b is supplied to the circulation inducing jet device 1420 through a steam discharge line 1442.

The second cooling water storage section 1430b is connected to a safety injection line 145a to inject borated water into the reactor coolant system 141. Cooling water safely injected from the second cooling water storage section 1430b circulates the reactor coolant system 141, and the first fluid discharged from the reactor coolant system 141 is supplied to the circulation inducing jet device 1420 through the steam discharge line 1442.

The circulation inducing jet device 1420 will be described with reference to FIGS. 10A and 10B.

Figure 10A:
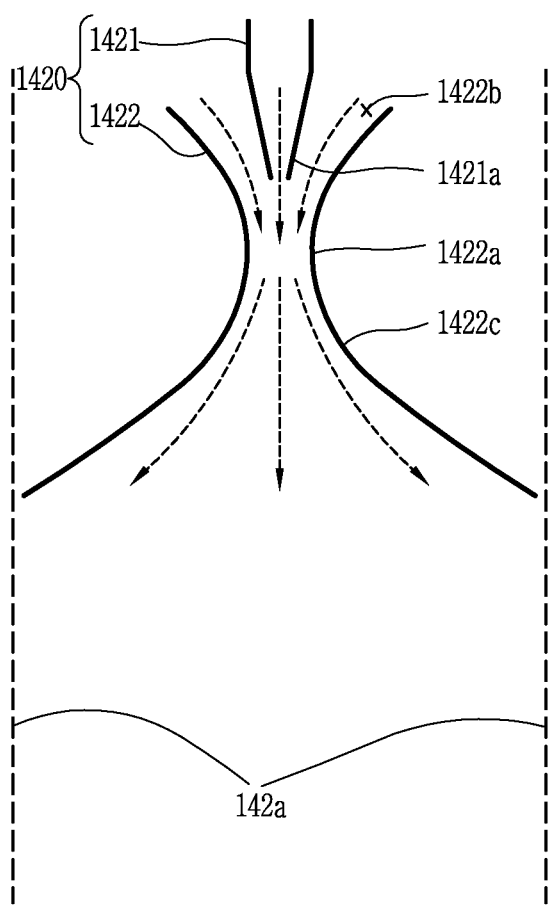
FIGS. 10A and 10B are enlarged conceptual views illustrating a circulation inducing jet device illustrated in FIG. 9.
Figure 10B:
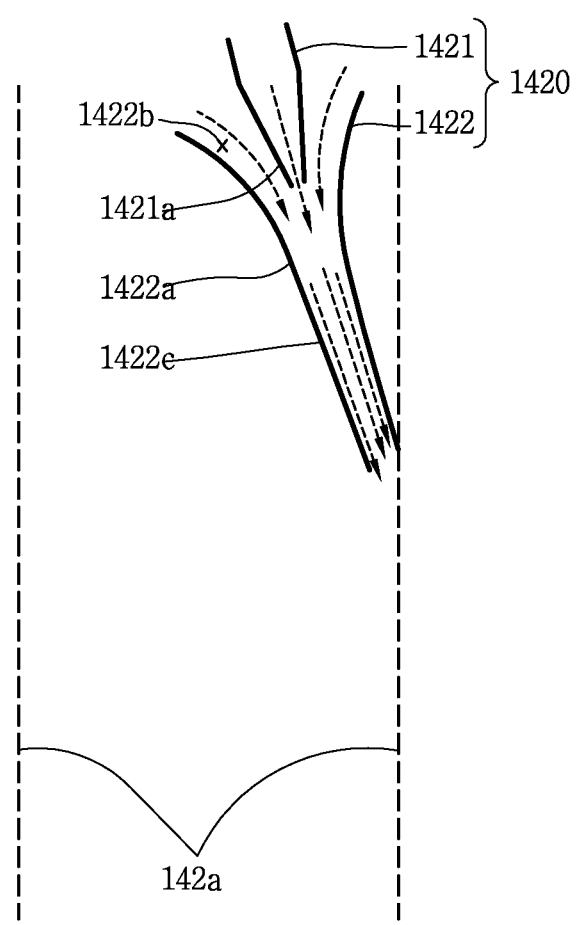

FIGS. 10A and 10B are enlarged conceptual views illustrating the circulation inducing jet device 1420 illustrated in FIG. 9. FIG. 10A is a conceptual view in which the circulation inducing jet device 1420 is seen from a front side, and FIG. 10B is a conceptual view in which the circulation inducing jet device 1420 is seen from a lateral side.

The circulation inducing jet device 1420 is formed to jet the first fluid and the second fluid to an inner wall surface of the containment vessel 142a. An outlet of the circulation inducing jet device 1420 is installed toward an inner wall surface of the containment vessel 142a.

The first fluid supplied from the steam discharge line 1442 (refer to FIG. 9) is jetted from a first fluid jetting section 1421. The second fluid is also entrained into the circulation inducing jet device 1420. The first fluid and second fluid is jetted to an inner wall surface of the containment vessel 142a. The first fluid and second fluid jetted to the containment vessel 142a are cooled and condensed on the inner wall surface of the containment vessel 142a.

Referring to FIG. 9 again, the cooling section is not installed as an additional device on the nuclear power plant 140, but the containment vessel 142a functions as the cooling section. The first fluid and second fluid jetted from the circulation inducing jet device 1120 transfer heat to the containment vessel 142a. Air that circulates the air circulation flow path 142c through the air inlet 142b' and cooling water sprayed from the passive containment vessel spray system 146 consistently cool the containment vessel 142a. Heat is discharged to an external environment by air that circulates the air circulation flow path 142c and cooling water sprayed on an outer surface of the containment vessel 142a.

A condensate holding section 1450 is installed at a lower portion of an outlet of the circulation inducing jet device to collect condensate condensed on an inner wall surface of the containment vessel 142a to fall.

On the contrary, the cooling water storage section 1430 may be also installed at a lower portion of an outlet of the circulation inducing jet device 1420 on the nuclear power plant 140 without installing the condensate holding section 1450 in a separate manner to collect condensate condensed on the inner wall surface of the containment vessel 142a to fall.

Hereinafter, the operation of the passive safety facility 1400 and the nuclear power plant 140 including the same as illustrated in FIG. 9 during the occurrence of an accident will be described.

Figure 11:
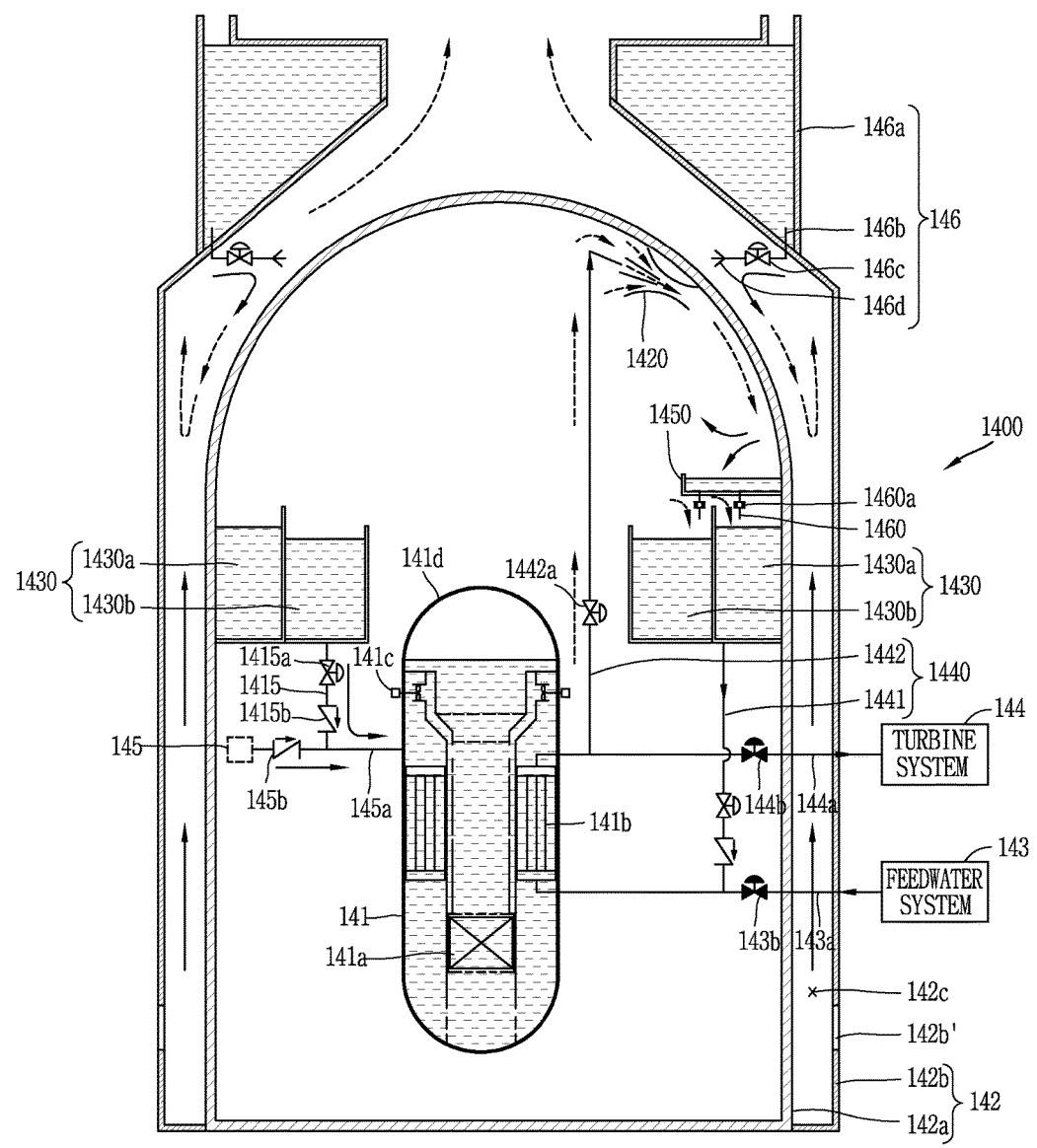
FIG. 11 is a conceptual view illustrating when an event occurs on a passive safety facility and a nuclear power plant including the same illustrated in FIG. 9.

FIG. 11 is a conceptual view illustrating when an event occurs on the passive safety facility 1400 and the nuclear power plant 140 including the same illustrated in FIG. 9.

When an accident occurs on the nuclear power plant 140, isolation valves 143b, 144b installed at the feedwater line 143a and steam line 144a, respectively, are closed. An isolation valve 145b installed at a safety injection line 145a for connecting between the safety injection facility 145 and the reactor coolant system 141 are open. An isolation valve 1415a and a check valve 1451b installed at a line 1415 for connecting between a safety injection line 145a and a second cooling water storage section 1430b are also open. When a pressure within the reactor coolant system 141 decreases, safety injection from the safety injection facility 145 or the second cooling water storage section 1430b into the reactor coolant system 141 is carried out by a gravity water head.

The first fluid that has received heat within the reactor coolant system 141 is evaporated through the steam discharge line 1442, and jetted to an inner wall surface of the containment vessel 142a along with the second fluid through the circulation inducing jet device 1420. Accordingly, heat is transferred from the first fluid and second fluid to the containment vessel 142a.

External air flows on an outer surface of the containment vessel 142a through the air inlet 142' to cool the containment vessel 142a while circulating the air circulation flow path 142c. The air that has received heat from the outer surface of the containment vessel 142a is ascended and discharged to an outside through an opening portion at an upper portion of the containment building 142b. Furthermore, the passive containment vessel spray system 146 sprays cooling water to an outer surface of the containment vessel 142a to cool the containment vessel 142a as the spray isolation valve 146c is open. The containment vessel 142a is cooled by air circulation and spraying. As the circulation inducing jet device 1420 sprays the first fluid and second fluid to the containment vessel 142a, heat transferred to the containment vessel 142a may be discharged to an external environment by air circulation and spraying.

Condensate formed by cooling and condensing the first fluid and second fluid on an inner wall surface of the containment vessel 142a falls, and returns to the cooling water storage section 1430 through the condensate holding section 1450.

According to the foregoing embodiments, noncondensible gas is discharged to an inside of the containment. Hereinafter, a passive safety facility including a filter facility for filtering out noncondensible gas and a nuclear power plant including the same will be described.

Figure 12:
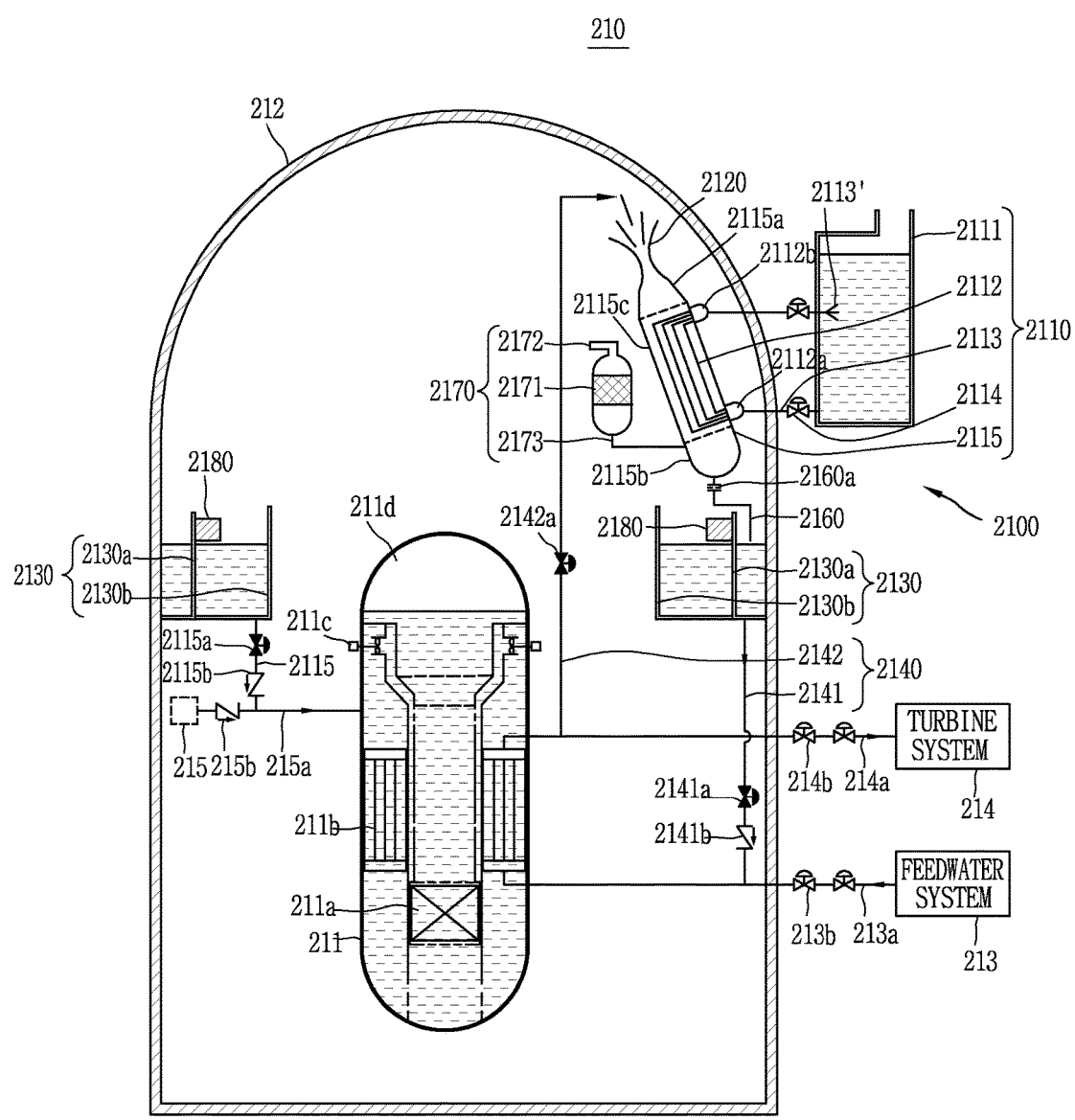
FIG. 12 is a conceptual view illustrating when a normal operation is carried out on a passive safely system and a nuclear power plant including the same associated with still yet another embodiment of the present disclosure.

FIG. 12 is a conceptual view illustrating a passive safely system 2100 and a nuclear power plant 210 including the same associated with still yet another embodiment of the present disclosure.

The nuclear power plant 210 may include a containment 212, a reactor coolant system 211, a core 211a, a steam generator 211b, a reactor coolant pump 211c and a pressurizer 211d. The nuclear power plant 210 may include systems for the normal operation of the nuclear power plant 210 and various systems for securing the safety of the nuclear power plant 210 in addition to the constituent elements illustrated in FIG. 12.

The reactor coolant system 211 is installed within the containment 212. The reactor coolant system 211 is a coolant system for transferring and transporting thermal energy generated by the fission of the core 211a. The first fluid is filled into the reactor coolant system 211. During the occurrence of an accident such as a loss of coolant accident, steam may be discharged from the reactor coolant system 211, and the containment 212 blocks radioactive materials contained in the steam from being leaked to an outside thereof.

The steam generator 211b generates steam using heat transferred from the core. A lower inlet of the steam generator 211b is connected to a feedwater system 213 by a feedwater line 213a, and an upper outlet of the steam generator 211b is connected to a turbine system 214 by a steam line 214a. Feedwater supplied to the steam generator 211b through the feedwater line 213a evaporates in the steam generator 211b to become steam. The steam is supplied to the turbine system 214 through the steam line 214a.

The reactor coolant pump 211c induces the circulation of the first fluid, and the pressurizer 211d maintains a pressurized state that exceeds a saturation pressure to prevent the boiling of coolant in the core 211a of a pressurized water reactor.

The containment 212 surrounds the reactor coolant system 211 to prevent radioactive materials from being leaked to an external environment. During the occurrence of an accident, such as a loss of coolant accident or non-loss of coolant accident, there is a concern of leaking radioactive materials from the reactor coolant system 211, and thus the containment 212 is formed to surround the reactor coolant system 211 at an outside of the reactor coolant system 211 to prevent the leakage of radioactive materials.

Various fluids for maintaining the safety of the nuclear power plant 210 exist within the containment 212. A fluid for cooling the core 211a is filled in the reactor coolant system 211. Furthermore, fluids for making preparations for various accidents are also filled within the containment 212. Hereinafter, it will be described that among fluids within the containment 212, a fluid discharged from the reactor coolant system 211 and a fluid existing in a space between the reactor coolant system 211 and the containment 212 are divided into a first fluid and a second fluid, respectively. However, such a division of fluids is irrelevant to the properties of a fluid or materials constituting a fluid. Accordingly, the first fluid and second fluid may be the same type of fluid. Furthermore, the first fluid and second fluid should be distinguished from a primary fluid and a secondary fluid. The primary fluid and the secondary fluid may be a first fluid or second fluid.

Referring to FIG. 12, a method of circulating the second fluid using the steam generator 211b is applied to the passive safely system 2100. Accordingly, both the first fluid and second fluid in the passive safely system 2100 illustrated in FIG. 12 indicate a secondary fluid. If it is a passive safety facility with a method of circulating the first fluid, then both the first fluid and second fluid indicate a primary fluid.

The passive safely system 2100 removes the sensible heat of the reactor coolant system 211 and the residual heat of the core 211a using a circulation method of the primary fluid or a circulation method of the secondary fluid. In case of using the circulation of the primary fluid, the passive safely system 2100 circulates the primary fluid to the reactor coolant system 211. In case of using the circulation of the secondary fluid, the passive safely system 2100 circulates the secondary fluid to the steam generator 211b.

The passive safely system 2100 is configured to cool the first fluid discharged from the reactor coolant system 211 or steam generator 211b and the second fluid within the containment 212 at the same time to discharge heat within the containment 212 to an external environment. FIG. 12 illustrates the passive safely system 2100 using the circulation method of the secondary fluid.

The passive safety facility 2100 uses a facility formed to accelerate circulation flow by getting out of a conventional method using pure natural convection flow. The passive safely system 2100 is configured to increase a heat and pressure reduction efficiency within the containment 212 and a removal efficiency of radioactive materials in a passive method.

Referring to FIG. 12, the passive safely system 2100 may include a cooling section 2110, a circulation inducing jet device 2120 and a filter facility 2170.

The cooling section 2110 is formed to cool the first fluid discharged from the steam generator 211b along with the second fluid within the containment 212. The cooling section 2110 is configured to discharge heat received from the first fluid and second fluid to an external environment of the containment 212 as the first fluid and second fluid are cooled.

The cooling section 2110 may include an emergency cooling water storage section 2111, a heat exchanger 2112, a connected line 2113 and an isolation valve 2114.

The emergency cooling water storage section 2111 is formed to store cooling water therein. The cooling water filled in the emergency cooling water storage section 2111 receives heat from the first fluid and second fluid by the heat exchanger 2112. When the temperature of the cooling water filled in the emergency cooling water storage section 2111 increases, the cooling water evaporates to discharge heat that has transferred to the cooling water to an external environment. At least part of an upper portion of the emergency cooling water storage section 2111 is open to allow cooling water to be evaporated to an external environment.

The heat exchanger 2112 is configured such that the cooling section of the emergency cooling water storage section 2111 exchanges heat with the first fluid and second fluid. The heat exchanger 2112 may be installed within the containment 212, and connected to the emergency cooling water storage section 2111 by the connected line 2113 passing through the containment 212. The heat exchanger 2112 allows cooling water flowing in from the emergency cooling water storage section 2111 through the connected line 2113 to pass therethrough to cool the first fluid and second fluid.

An inlet header 2112a for distributing cooling water supplied from the emergency cooling water storage section 2111 to an internal flow path of the heat exchanger 2112 is installed at an inlet of the heat exchanger 2112. An outlet header 2112b for collecting heated cooling water from the internal flow path of the heat exchanger 2112 is installed at an outlet of the heat exchanger 2112.

The connected line 2113 is connected to the heat exchanger 2112 and emergency cooling water storage section 2111 to form a circulating flow path of cooling water stored in the emergency cooling water storage section 2111. A plurality of connected lines 2113 are provided therein and connected to the inlet header 2112a and outlet header 2112b, respectively, of the heat exchanger 2112. The connected line 2113 passes through at least part of the containment 212, and extended to an inside of the emergency cooling water storage section 2111.

A sparger 2113' for jetting cooling water may be installed at an end portion of the connected line 2113. Cooling water returned from the heat exchanger 2112 to the emergency cooling water storage section 2111 by the connected line 2113 may be jetted to an inside of the emergency cooling water storage section 2111 by the sparger 2113'.

The isolation valve 2114 may be installed at each connected line 2113. The isolation valve 2114 may be closed and isolated when the system is damaged during an accident or switched for maintenance at the time point when the maintenance is required.

The cooling section 2110 may be divided according to the operation mechanism of the emergency cooling water storage section 2111 and heat exchanger 2112. As illustrated in FIG. 12, the cooling section 2110 in such a type that the heat exchanger 2112 is connected to the emergency cooling water storage section 2111 by the connected line 2113, and the cooling water of the emergency cooling water storage section 2111 consistently circulates the heat exchanger 2112 may be divided into a circulation type. The cooling section 2110 with a circulation type uses natural circulation based on a density difference due to a difference between cooling water temperatures or phases.

The cooling section 2110 may be also divided into an immersion type or injection type in addition to the circulation type, and the configuration of the immersion type and injection type will be described later.

The circulation inducing jet device 2120 is formed to jet the first fluid discharged from the reactor coolant system 211 or steam generator 211b to the cooling section 2110. When the first fluid is jetted, a pressure drop is locally caused in the circulation inducing jet device 2120. At least part of the circulation inducing jet device 2120 is open toward an inside of the containment 212 to entrain the second fluid by a pressure drop caused while jetting the first fluid. The circulation inducing jet device 2120 jets the entrained second fluid along with the first fluid to the cooling section 2110. The detailed structure and operation mechanism of the circulation inducing jet device 2120 will be substituted by the earlier description.

The circulation inducing jet device 2120 jets the first fluid and second fluid to the heat exchanger 2112. The jetted first fluid and second fluid exchange heat with cooling water in the heat exchanger 2112.

An inlet header 2112a for distributing cooling water supplied from the emergency cooling water storage section 2111 to an internal flow path of the heat exchanger 2112 is installed at an inlet of the heat exchanger 2112. An outlet header 2112b for collecting heated cooling water from the internal flow path is installed at an outlet of the heat exchanger 2112. A casing 2115 for protecting the heat exchanger 2112 from missiles (fragments) during an accident is installed on a circumference of the heat exchanger 2112.

The circulation inducing jet device 2120 is formed to jet the first fluid and second fluid to a surface of the heat exchanger 2112. However, when a shell-and-tube type heat exchanger is employed according to the design characteristics of the nuclear power plant 210, shell and tube side flow paths may be configured in an opposite manner. The first fluid and second fluid jetted from the circulation inducing jet device 2120 are cooled and condensed on a surface of the heat exchanger 2112 by exchanging heat with the cooling water passing through the internal flow path of the heat exchanger 2112.

Due to such a structural feature of the circulation inducing jet device 2120, the present disclosure may overcome the limitation of the related art depending on pure natural convection within the containment 212, and promote the circulation flow of the first fluid and second fluid to enhance cooling efficiency within the containment 212.

The casing 2115 surrounds the heat exchanger 2112 to protect the heat exchanger 2112. Furthermore, the casing 2115 is configured to accommodate the first fluid and second fluid jetted from the circulation inducing jet device 2120.

An upper portion 2115a of the casing 2115 is connected to the circulation inducing jet device 2120. A lower portion 2115b of the casing 2115 is sealed excluding a gas line 2173 and a return line 2160. An intermediate portion 2115c connecting between the upper portion 2115a and the lower portion 2115b surrounds the heat exchanger 2112. Condensate formed by cooling the first fluid and second fluid may be collected into the lower portion 2115b of the casing 2115.

The filter facility 2170 is connected to an outlet of the cooling section 2110 to filter out noncondensible gas discharged from the cooling section 2110. In the passive safely system 2100 illustrated in FIG. 12, the outlet of the cooling section 2110 refers to the lower portion 2115b of the casing 2115. The filter facility 2170 collects radioactive materials filtered out from the noncondensible gas.

The filter facility 2170 may include a filter or absorbent 2171, and a gas discharge section 2172 and a gas line 2173.

The filter or absorbent 2171 is configured to separate the radioactive materials from the noncondensible gas.

The filter may use a high efficiency particulate air filter (2HEPA filter). Radioactive materials in a gas phase contained in the noncondensible gas are removed while passing through the filter. For example, when the radioactive material is iodine, the iodine is combined with silver nitrate (2silver nitrate) and converted to iodic silver while passing through the filter. Iodic silver is a form that is separable from noncondensible gas. The filter is configured to form iodic silver by reacting silver nitrate with iodine contained in noncondensible gas. Furthermore, the filter is formed to remove iodic silver from the fluid.

The absorbent may use charcoal. Iodine organic compounds are combined with materials impregnated into charcoal and converted to a form of quaternary ammonium salt, and adsorbed into the charcoal. Iodine in a molecular form is combined with charcoal through chemical absorption. Charcoal is used as an absorbent material since it has a large internal contact area due to its porous structure. Accordingly, the absorbent is formed to remove iodine contained in noncondensible gas through chemical absorption that is carried out by charcoal.

However, the foregoing filter and absorbent are merely an example, and the types of the filter and absorbent may not be necessarily limited to them.

The gas discharge section 2172 is configured to discharge noncondensible gas filtered out while passing through the filter or absorbent 2171 to an inside of the containment 212.

Radioactive materials are mostly collected by the filter or absorbent 2171, and thus there hardly exist radioactive materials in noncondensible gas discharged from the gas discharge section 2172.

The gas line 2173 is connected to the outlet of the cooling section 2110 to supply the noncondensible gas to the filter or absorbent 2171. As illustrated in FIG. 12, the gas line may be connected to the lower portion 2115*b* of the casing 2115.

The passive safely system 2100 may further include a cooling water storage section 2130, a fluid circulation section 2140, a return line 2160 and an additive injection section 2180.

The cooling water storage section 2130 is formed to store cooling water to be injected into the reactor coolant system 211 or steam generator 211*b* therein. The cooling water storage section may be installed below cooling water to collect condensate collected into the lower portion 2115*b* of the casing 2115. The cooling water storage section 2130 may be installed at a position higher than that of the reactor coolant system 211 or steam generator 211*b* to allow the injection of cooling water due to a gravity water head.

The cooling water stored in the cooling water storage section 2130 may be used for the purpose of removing sensible heat within the reactor coolant system 211 and residual heat in the core 211*a* according to the design. Furthermore, the cooling water stored in the cooling water storage section 2130 may be used for the purpose of being injected into the reactor coolant system 211.

Since sensible heat and residual heat generated from the core 111*a* exist within the reactor coolant system 211 during the occurrence of an accident, the sensible heat and residual heat should be removed to safely maintain the core 211*a*. A method of circulating cooling water to the steam generator 211*b* to remove sensible heat and residual heat is applied to the present embodiment. The cooling water storage section 2130 may be connected to the feedwater line 213*a* to use cooling water stored therein for the removal of residual heat. The cooling water storage section 2130 illustrated in the right side of the FIG. 12 will be referred to such a structure.

Furthermore, since a water level of the reactor coolant system 211 decreases during the occurrence of an accident such as a loss of coolant accident, cooling water should be injected into the reactor coolant system 211 to maintain the water level. The cooling water storage section 2130 may be connected to the safety injection line 215*a* by a line 2115 to use cooling water stored therein for safety injection. The cooling water storage section 2130 illustrated in the left side of the FIG. 12 will be referred to such a structure.

A safety injection facility 215, which is another safety system of the nuclear power plant 210, injects cooling water to the reactor coolant system 211 to maintain a water level of the reactor coolant system 211. The safety injection facility 215 may include various tanks (not shown) for storing safety injection water, a safety injection line 215*a*, a valve 215*b*, and the like. The safety injection line 215*a* connects the tanks to the reactor coolant system 211, and the valve 215*b* may be installed at the safety injection line 215*a*. The cooling water storage section 2130 may be connected to the safety injection line 215*a* for safety injection.

The cooling water storage section 2130 may include a first cooling water storage section 2130*a* and a second cooling water storage section 2130*b* to store pure cooling water to be used for residual heat removal and borated water to be used for safety injection, respectively, in a separate manner as illustrated in FIG. 12.

The first cooling water storage section 2130*a* stores pure cooling water to be supplied to the steam generator 211*b* to remove sensible heat within the reactor coolant system 211 and residual heat in the core 211*a*. The second cooling water storage section 2130*b* stores borated water to be directly injected into the reactor coolant system 211 to maintain the water level of the reactor coolant system 211.

The fluid circulation section 2140 is formed to circulate the cooling water of the cooling water storage section 2130 to the circulation inducing jet device 2120 through the reactor coolant system 211 or the steam generator 211*b*. The fluid circulation section 2140 may include a fluid supply line 2141 and a steam discharge line 2142.

The fluid supply line 2141 is connected to the cooling water storage section 2130 to supply cooling water within the cooling water storage section 2130 to the reactor coolant system 211 or steam generator 211*b*. The fluid supply line 2141 may be directly or indirectly connected to the reactor coolant system 211. For example, the fluid supply line 2141 may be connected to the feedwater line 213*a* to supply cooling water to the steam generator 211*b* within the reactor coolant system 111 as illustrated in FIG. 12. An isolation valve 2141*a* and a check valve 2141*b* may be installed at the fluid supply line 2141.

The steam discharge line 2142 is connected to the reactor coolant system 211 or steam generator 211*b* and circulation inducing jet device 2120 to supply the first fluid discharged from the reactor coolant system 211 or steam generator 211*b* to the circulation inducing jet device 2120. The steam discharge line 2142 is connected to the steam generator 211*b* to supply the first fluid discharged from the steam generator 211*b* to the circulation inducing jet device 2120 as illustrated in the drawing. An isolation valve 2142*a* may be installed at the steam discharge line 2142.

The return line 2160 is extended from the casing 2115 to the cooling water storage section to supply condensate collected in the lower portion 2115*b* of the casing 2115 to the cooling water storage section 2130. A flow regulator 2160*a* for controlling the flow of the condensate may be installed at the return line 2160.

When the condensate is returned to the cooling water storage section 2130 through the return line 2160, one circulation of cooling water started from the cooling water storage section 2130 is completed. The circulation of flow is induced in a passive method by natural forces, and thus the circulation of flow does not end by one circulation. The circulation of flow may continue to be sustained while a sufficient passive force capable of inducing the circulation of flow within the containment 212 is maintained by generating steam from the reactor coolant system 211 or steam generator 211*b*.

An additive injection section 2180 injects an additive into condensate for suppressing the revolatilization of condensate collected in the cooling water storage section 2130. The additive is formed to maintain a pH of the condensate above a preset value.

Radioactive iodine dissolved in cooling water exists in the form of negative ions, and when a pH of cooling water dissolved therein is low, the revolatilization amount of radioactive iodine may greatly increase. The reason is because an amount of radioactive iodine being converted to the form of volatile elemental iodine (2I2) greatly increases in cooling water below pH 7. In addition, the amount of being converted to elemental iodine is also related to a temperature of soluble cooling water, a concentration of iodine in the solution, and the like. The converted elemental iodine may be revolatilized into atmosphere according to a separation factor defined as a ratio of a concentration of iodine in cooling water to a concentration of iodine in atmosphere. According to the related regulatory requirements, when a pH of soluble cooling water is above 7.0, the amount of being converted to elemental iodine is sharply reduced to ignore revolatilization.

Trisodium phosphate may be used for the additive, for example. Trisodium phosphate controls the pH of cooling water to prevent corrosion within the containment 212 and the revolatilization of radioactive nuclides during an accident. However, according to the present disclosure, the type of the additive may not be necessarily limited to this. Boric acid for suppressing the reactivity of the core 211a and other additives for suppressing the corrosion of the device or the like may be added to the additive to manage the water quality of the cooling water storage section 2130 in a passive manner.

The cooling water storage section 2130 is configured to flow the condensate collected in the first cooling water storage section 2130a into the second cooling water storage section 2130b when a level of condensate collected in the first cooling water storage section 2130a exceeds a reference level. For example, when the level of the first cooling water storage section 2130a gradually increases and exceeds the reference level by the collection of the condensate, the condensate collected in the first cooling water storage section 2130a may overflow and flow into the second cooling water storage section 2130b.

The additive injection section 2180 may be installed at a flow path connected from the first cooling water storage section 2130a to the second cooling water storage section 2130b to inject the additive to condensate flowing into the second cooling water storage section 2130b. Accordingly, the additive injection section 2180 may inject an additive into condensate flowing into the second cooling water storage section 2130b.

Hereinafter, the operation of the passive safety facility 2100 and the nuclear power plant 210 including the same during the occurrence of a virtual event will be described with reference to FIG. 13.

Figure 13:
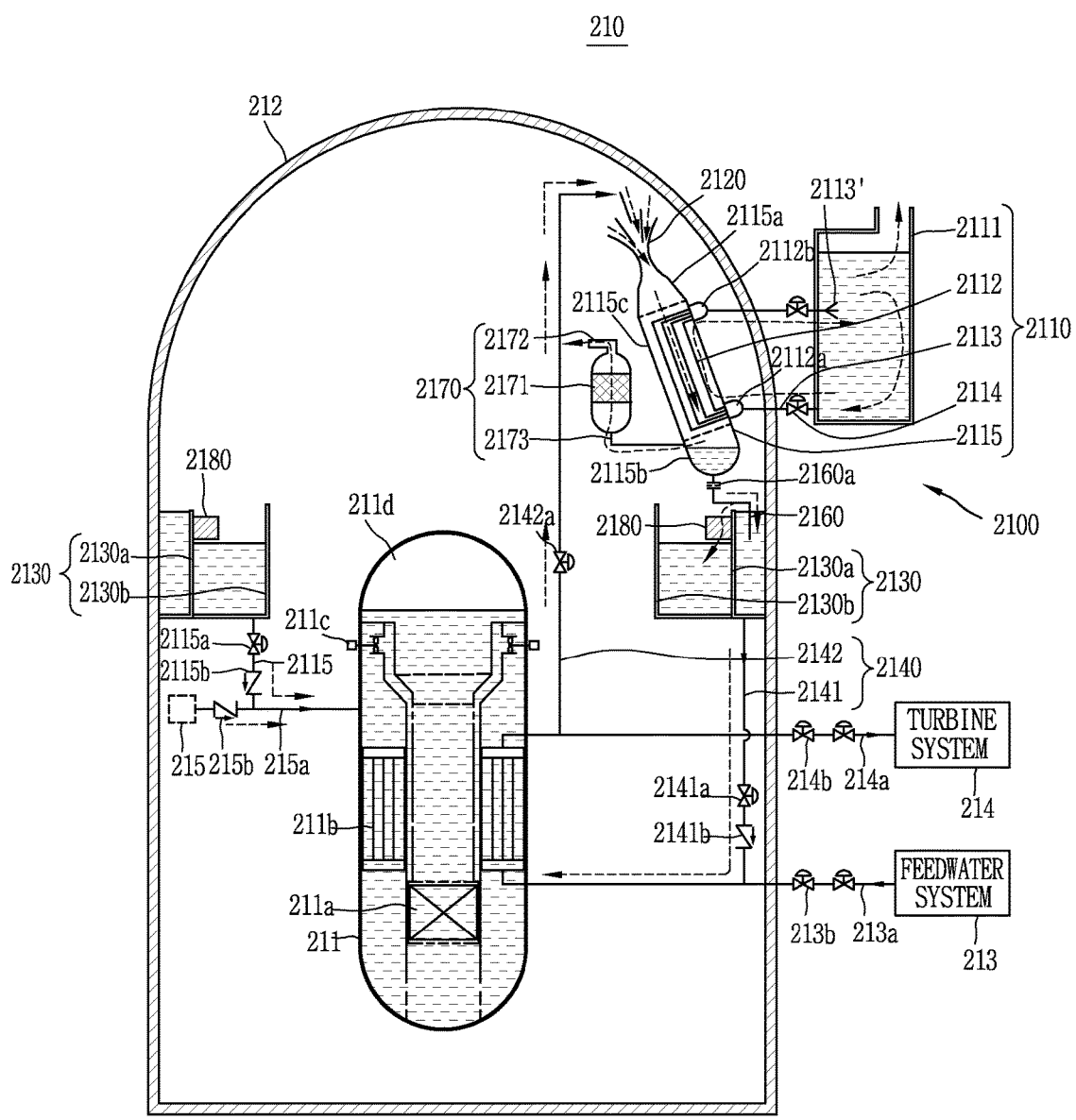
FIG. 13 is a conceptual view illustrating when an event occurs on a passive safely system and a nuclear power plant including the same illustrated in FIG. 12.

FIG. 13 is a conceptual view illustrating when an event occurs on the passive safety facility 2100 and the nuclear power plant 210 including the same illustrated in FIG. 12.

When an accident such as a loss of coolant accident occurs, isolation valves 213b, 214b installed at the feedwater line 213a and steam line 214a, respectively, are closed, and valves 215b installed at the safety injection line 215a are open. Then, safety injection is implemented by the safety injection facility 215 to the reactor coolant system 211.

An isolation valve 2115a and a check valve 2115b are installed at a line 2115 connecting between the second cooling water storage section 2130b and the safety injection line 215a, and the isolation valve 2115a and check valve 2115b are also open when an event occurs. Accordingly, when an internal pressure of the reactor coolant system 211 decreases, borated water stored in the second cooling water storage section 2130b is also injected into the reactor coolant system 211 by a gravity water head. The borated water stored in the second cooling water storage section 2130b performs the role of maintaining a water level within the reactor coolant system 211 along with the safety injection facility 215.

The isolation valve 2141a and check valve 2141b installed at the fluid supply line 2141 are also open to start the supply of cooling water due to a gravity water head from the first cooling water storage section 2130a. The cooling water is supplied to a lower inlet of the steam generator 211b through the feedwater line 213a. The cooling water removes sensible heat within the reactor coolant system 211 and residual heat in the core 211a in the steam generator 211b, and is discharged to an upper outlet of the steam generator 211b.

The isolation valve 2142a installed at the steam discharge line 2142 is also open, and the first fluid discharged to an upper portion of the steam generator 211b is evaporated through the steam discharge line 2142. The first fluid is supplied to the circulation inducing jet device 2120, and the circulation inducing jet device 2120 jets the first fluid supplied through the steam discharge line 2142 and the second fluid entrained from an inside of the containment 212 by a pressure drop to an inside of the casing 2115.

The first fluid and second fluid jetted from the circulation inducing jet device 2120 exchange heat with the cooling water of the emergency cooling water storage section 2111 in the heat exchanger 2112. The cooling water of the emergency cooling water storage section 2111 is supplied to the heat exchanger 2112 through the connected line 2113, and exchanges heat with the first fluid and second fluid while passing through an internal flow path of the heat exchanger 2112. The cooling water of the emergency cooling water storage section 2111 continuously circulates the emergency cooling water storage section 2111 and heat exchanger 2112 through the connected line 2113.

Heat is transferred to cooling water from the first fluid and second fluid. The first fluid and second fluid are cooled and condensed, and the cooling water is heated. The cooling water within the emergency cooling water storage section 2111 evaporates when the temperature increases. Accordingly, heat is discharged to an external environment.

The condensate formed by cooling and condensing the first fluid and second fluid in the heat exchanger 2112 is collected into a lower portion 2115b of the casing 2115. The collected condensate is guided through the return line 2160 and returned to the first cooling water storage section 2130a. The circulation of flow is carried out in a continuous and consistent manner.

When condensate is continuously collected in the first cooling water storage section 2130a, the level of the first cooling water storage section 2130a gradually increases. Then, as the level of the first cooling water storage section 2130a increases, the condensate flows into the second cooling water storage section 2130b from the first cooling water storage section 2130a. During the process, the additive injection section 2180 injects an additive to the condensate. Accordingly, the revolatilization of the condensate flowing into the second cooling water storage section 2130b may be suppressed.

Noncondensible gas discharged along with the condensate is flowed into the filter facility 2170 and filtered out. The noncondensible gas is supplied to the filter or absorbent 2171 through a flow path formed by the gas line 2173. The filter or absorbent 2171 separates radioactive materials from the noncondensible gas. The filtered noncondensible gas is discharged to an inside of the containment 212 through the gas discharge section 2172.

The present disclosure has an effect of reducing a concentration of radioactive materials within the containment 212 at an early stage by the filter facility 2170. Assuming an accident at a nuclear power plant, an exclusion area boundary (EAB) is set to the nuclear power plant for the safety of the general public during an accident to limit the residence of the general public. The present disclosure may reduce the exclusion area boundary by the filter facility 2170.

Among the related arts, a filtered containment ventilation system (FCVS) has been developed to prevent the damage of the containment and reduce a concentration of radioactive materials discharged to an external environment during the occurrence of an accident in which a pressure within the containment greatly increases (AREVA in France, Westinghouse in United States, etc.). The concept in which a filter facility is installed at a boundary between an inside and an outside of the containment, and the boundary is open (using a rupture disc, a valve, etc.) when an accident occurs in which a pressure within the containment greatly increases, and atmosphere within the containment is discharged through the filter facility is applied to the filtered containment ventilation system (FCVS).

When a design basis exceeding accident (here, design basis exceeding accident denotes an accident in which an internal pressure of the containment greatly increases above a design pressure) occurs at a nuclear power plant employing a filtered containment ventilation system in the related art, a rupture disc or valve installed between an inside of the containment and the filter facility is open, and a flow is formed by a pressure difference formed at an inside and an outside of the containment (a difference between a high pressure formed within the containment and an external atmospheric pressure). Then, atmosphere (air and steam) within the containment is passed through the filter facility and then discharged to an outside thereof by the flow.

However, the filtered containment ventilation system in the related art does not operate during the occurrence of a design basis accident (here, design basis accident denotes an accident in which an internal pressure of the containment is within a design pressure range). Accordingly, the filtered containment ventilation system in the related art is unable to reduce the concentration of radioactive materials within the containment during the occurrence of a design basis accident, thereby causing a problem in which the amount of radioactive materials being leaked out of the containment cannot be greatly suppressed.

On the contrary, the filter facility 2170 according to the present disclosure is configured to operate during the occurrence of all accidents including a design basis accident as well as a design basis exceeding accident. The filter facility 2170 is configured to discharge noncondensible gas having a very low radioactive material concentration into the containment 212. Radioactive materials are collected into the filter facility 2170 while passing through the filter or absorbent 2171. The present disclosure may very effectively reduce a radioactive material concentration within the containment 212, thereby significantly reducing the amount of radioactive materials being leaked out of the containment 212. Furthermore, the present disclosure may decrease the exclusion area boundary.

Figure 14:
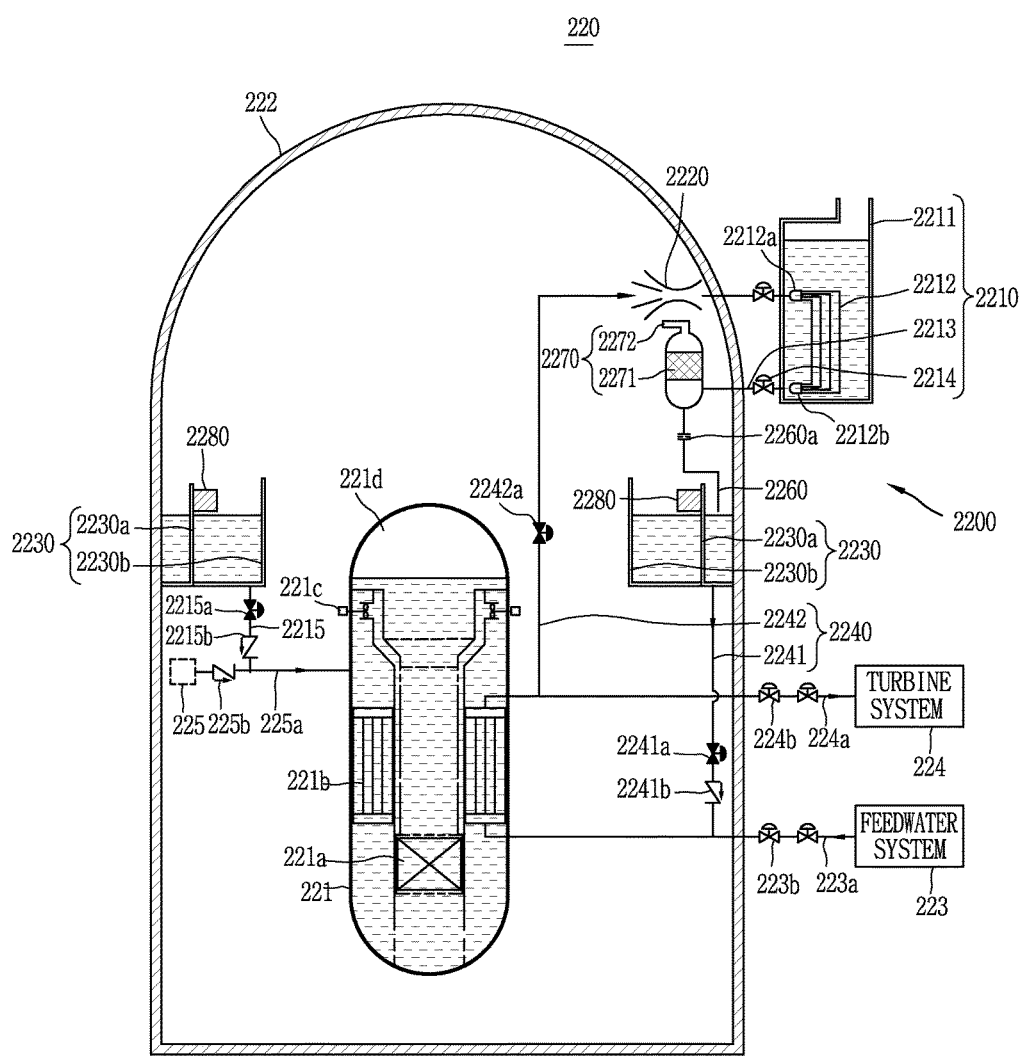
FIG. 14 is a conceptual view illustrating when a normal operation is carried out on a passive safely system and a nuclear power plant including the same associated with yet still another embodiment of the present disclosure.

FIG. 14 is a conceptual view illustrating when a normal operation is carried out on a passive safely system 2200 and a nuclear power plant 220 including the same associated with yet still another embodiment of the present disclosure.

An emergency cooling water storage section 2211 is installed outside the containment 222, and cooling water is stored within the emergency cooling water storage section 2211.

A heat exchanger 2212 is installed within the emergency cooling water storage section 2211. An inlet header 2212a and an outlet header 2212b of the heat exchanger 2212 are respectively connected to a connected line 2213 passing through the containment 222. The connected line 2213 is connected to a circulation inducing jet device 2220 to supply the first fluid and second fluid jetted from the circulation inducing jet device 2220 to the heat exchanger 2212. Furthermore, another connected line 2213 is connected to a filter facility 2270 to supply condensate and noncondensible gas formed by the cooling of the first fluid and second fluid to the filter facility 2270.

The heat exchanger 2212 illustrated in FIG. 14 is immersed in the cooling water of the emergency cooling water storage section 2211. In this aspect, the cooling section 2210 of FIG. 14 may be divided into an immersion type. However, the present embodiment illustrates an immersion type as an example, but may be also configured with an air-cooled type by exposing the heat exchanger 2212 to atmosphere and installing a duct (not shown) without installing the emergency cooling water storage section 2211.

The circulation inducing jet device 2220 is connected to a steam discharge line 2242 to supply the first fluid from a steam generator 221b. The circulation inducing jet device 2220 is connected to the connected line 2213 to jet the first fluid received from the steam discharge line 2242 and the second fluid entrained by a pressure drop to the connected line 2213.

The heat exchanger 2212 allows the first fluid and second fluid entrained through the connected line 2213 to pass through an internal flow path to exchange heat with the cooling water of the emergency cooling water storage section 2211.

The filter facility 2270 is installed within the containment 222. The containment 222 is connected to the heat exchanger 2212 by the connected line 2213 to receive condensate and noncondensible gas from the heat exchanger 2212. A return line 2260 is extended from a lower portion of the filter facility 2270 to a first cooling water storage section 2230a to transfer condensate supplied to the filter facility 2270.

Figure 15:
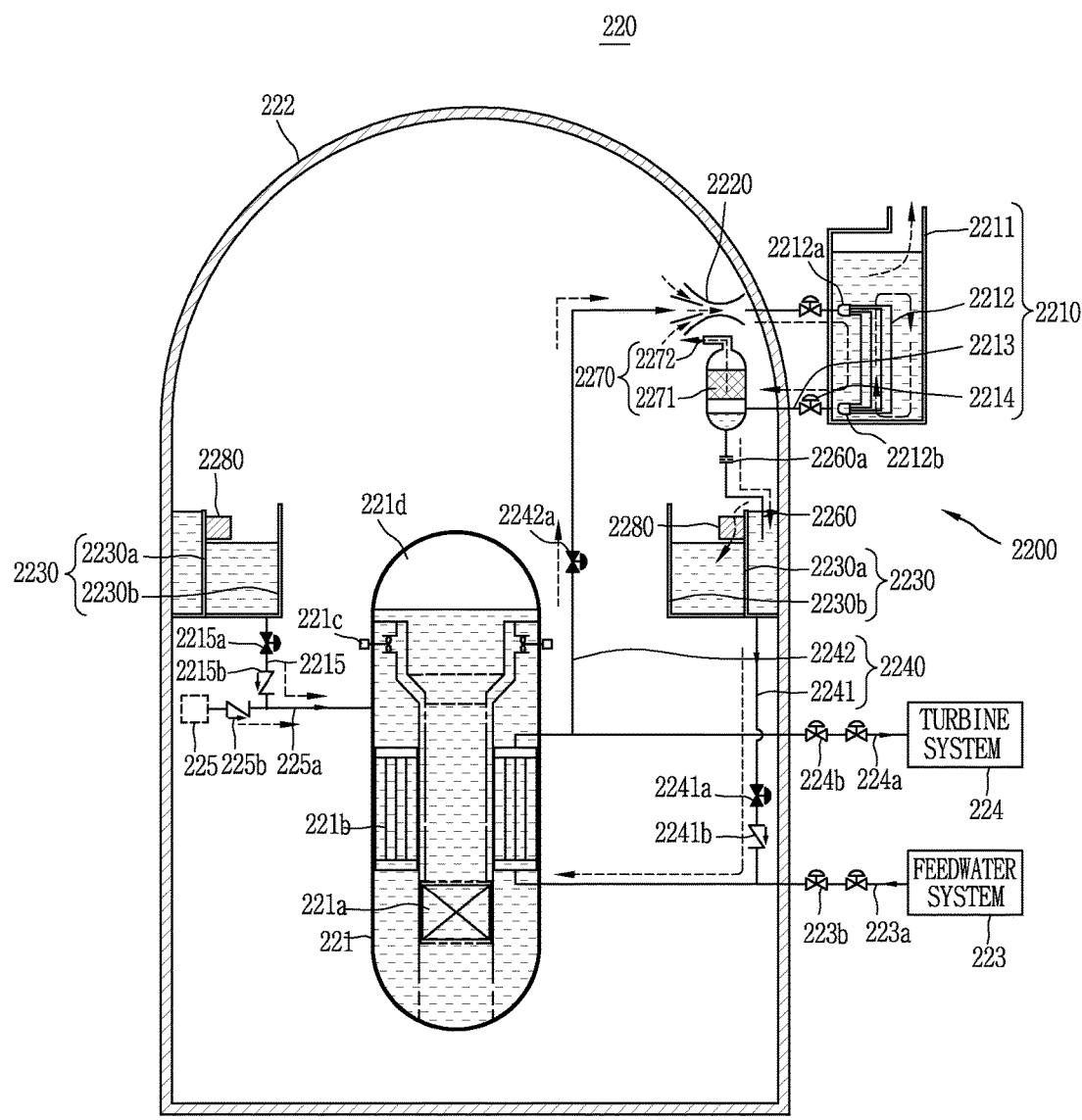
FIG. 15 is a conceptual view illustrating when an event occurs on a passive safely system and a nuclear power plant including the same illustrated in FIG. 14.

FIG. 15 is a conceptual view illustrating when an event occurs on a passive safely system 2200 and a nuclear power plant 220 including the same illustrated in FIG. 14.

When an accident occurs on the nuclear power plant 220, isolation valves 223b, 224b installed at the feedwater line 223a and steam line 224a, respectively, are closed. Then, an isolation valve 2241a and a check valve 2241b installed at a fluid supply line 2241 are open, and an isolation valve 2215a and a check valve 2251b installed at a line 2215 for connecting between a second cooling water storage section 2230b and a safety injection line 225a are also open.

The cooling water of the second cooling water storage section 2230b is safely injected into a reactor coolant system 221 along with the safety injection facility 225. The cooling water of the first cooling water storage section 2230a is supplied to a steam generator 221b through the fluid supply line 2241 to remove sensible heat within the reactor coolant system 221 and residual heat in the core 221a.

During an accident, a steam discharge line 2242 and an isolation valve 2242a are open. The first fluid discharged from the steam generator 221b is evaporated through the steam discharge line 2242, and supplied to the circulation inducing jet device 2220. The second fluid is entrained into the circulation inducing jet device 2220 and jetted to the connected line 2213 along with the first fluid. The first fluid and second fluid are supplied to the heat exchanger 2212 through the connected line 2213. The first fluid and second fluid are cooled and condensed by the cooling water of the emergency cooling water storage section 2211 while passing through an internal flow path of the heat exchanger 2212.

Condensate and noncondensible gas discharged from the heat exchanger 2212 are supplied to the filter facility 2270 through the connected line 2213. The condensate in the filter facility 2270 is returned to the first cooling water storage section 2230a through the return line 2260. The noncondensible gas in the filter facility 2270 is filtered out while passing through the filter or absorbent 2271. The filtered noncondensible gas is discharged to an inside of the containment 222 through a gas discharge section 2272.

Figure 16:
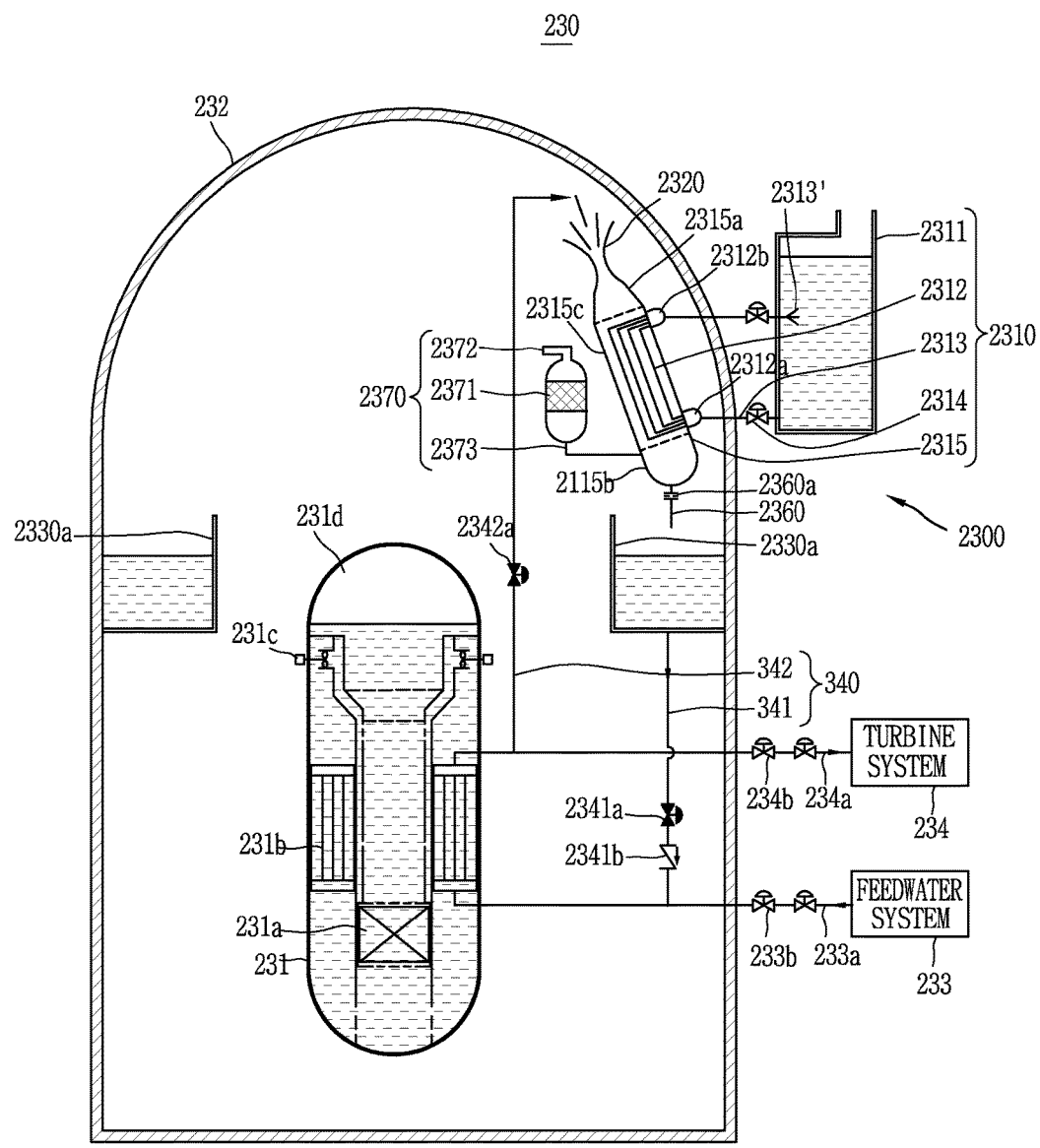
FIG. 16 is a conceptual view illustrating when a normal operation is carried out on a passive safely system and a nuclear power plant including the same associated with still yet another embodiment of the present disclosure.
Figure 17:
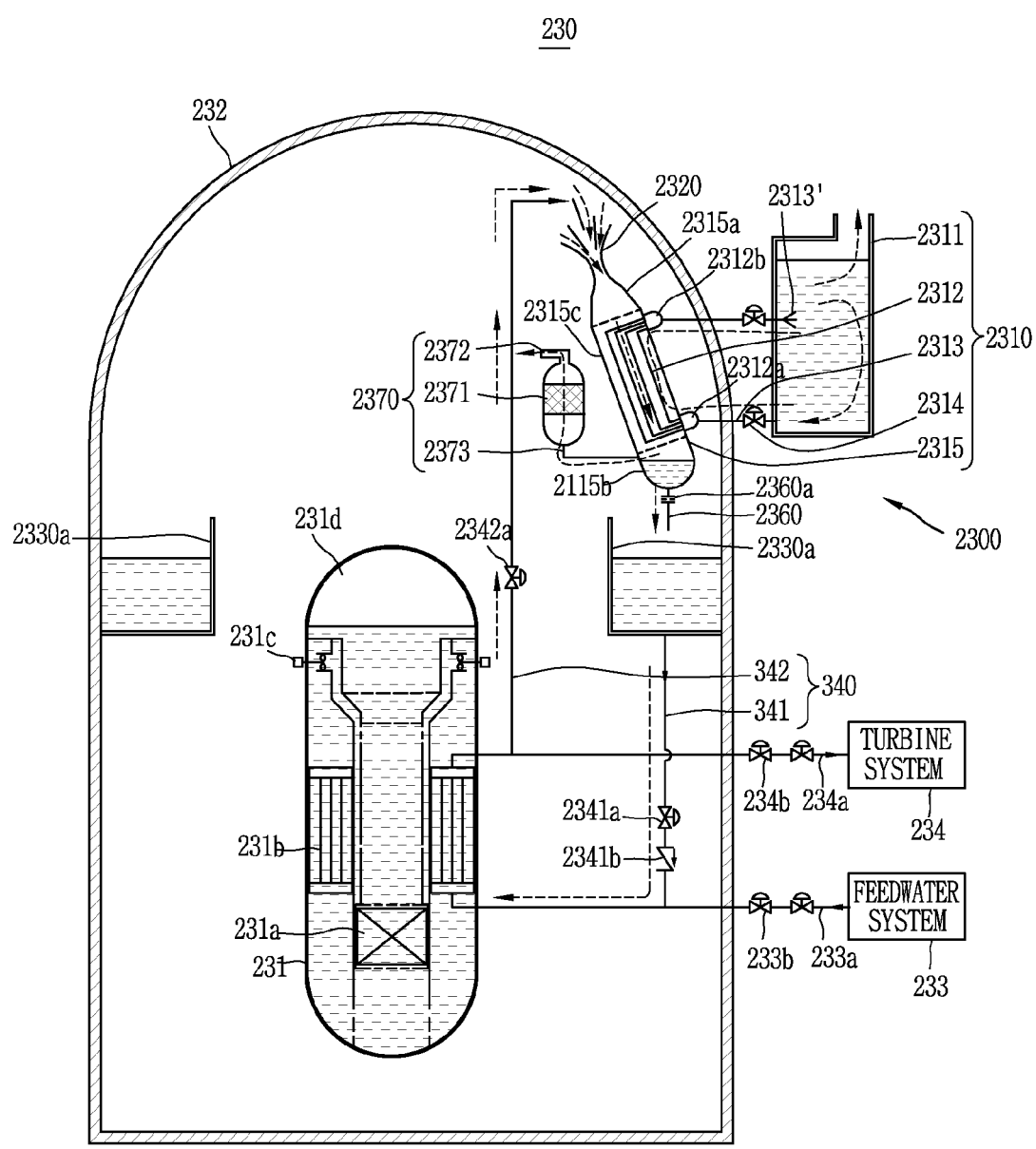
FIG. 17 is a conceptual view illustrating when an event occurs on a passive safely system and a nuclear power plant including the same illustrated in FIG. 16.

FIG. 16 is a conceptual view illustrating when a normal operation is carried out on a passive safely system 2300 and a nuclear power plant 230 including the same associated with still yet another embodiment of the present disclosure. FIG. 17 is a conceptual view illustrating when an event occurs on the passive safely system 2300 and the nuclear power plant 230 including the same illustrated in FIG. 16.

The passive safely system 2300 is distinguished from that of the foregoing embodiment in that it includes a first cooling water storage section 2330a but does not include a second cooling water storage section. The passive safely system 2300 removes sensible heat within a reactor coolant system 231 and residual heat in a core 231a using a secondary system. The pure cooling water of the first cooling water storage section 2330a is supplied to a steam generator 231b for a passive residual heat removal function.

A cooling section 2310 illustrated in FIGS. 16 and 17 is the same as the cooling section 2110 illustrated in FIG. 12, and thus may be divided into a circulation type. The remaining configuration and operation will be substituted by the description of FIGS. 12 and 13.

Figure 18:
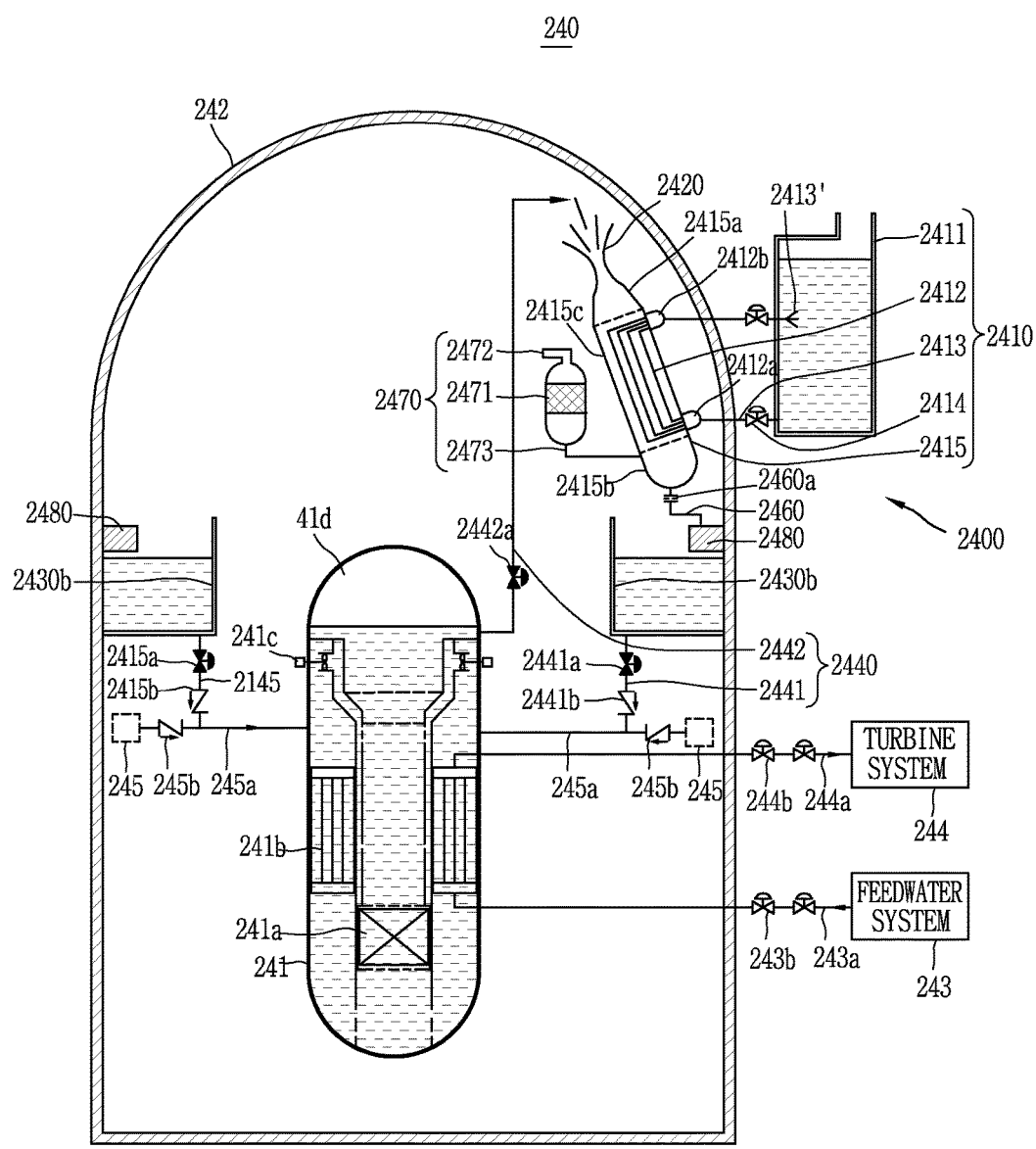
FIG. 18 is a conceptual view illustrating when a normal operation is carried out on a passive safely system and a nuclear power plant including the same associated with yet still another embodiment of the present disclosure.
Figure 19:
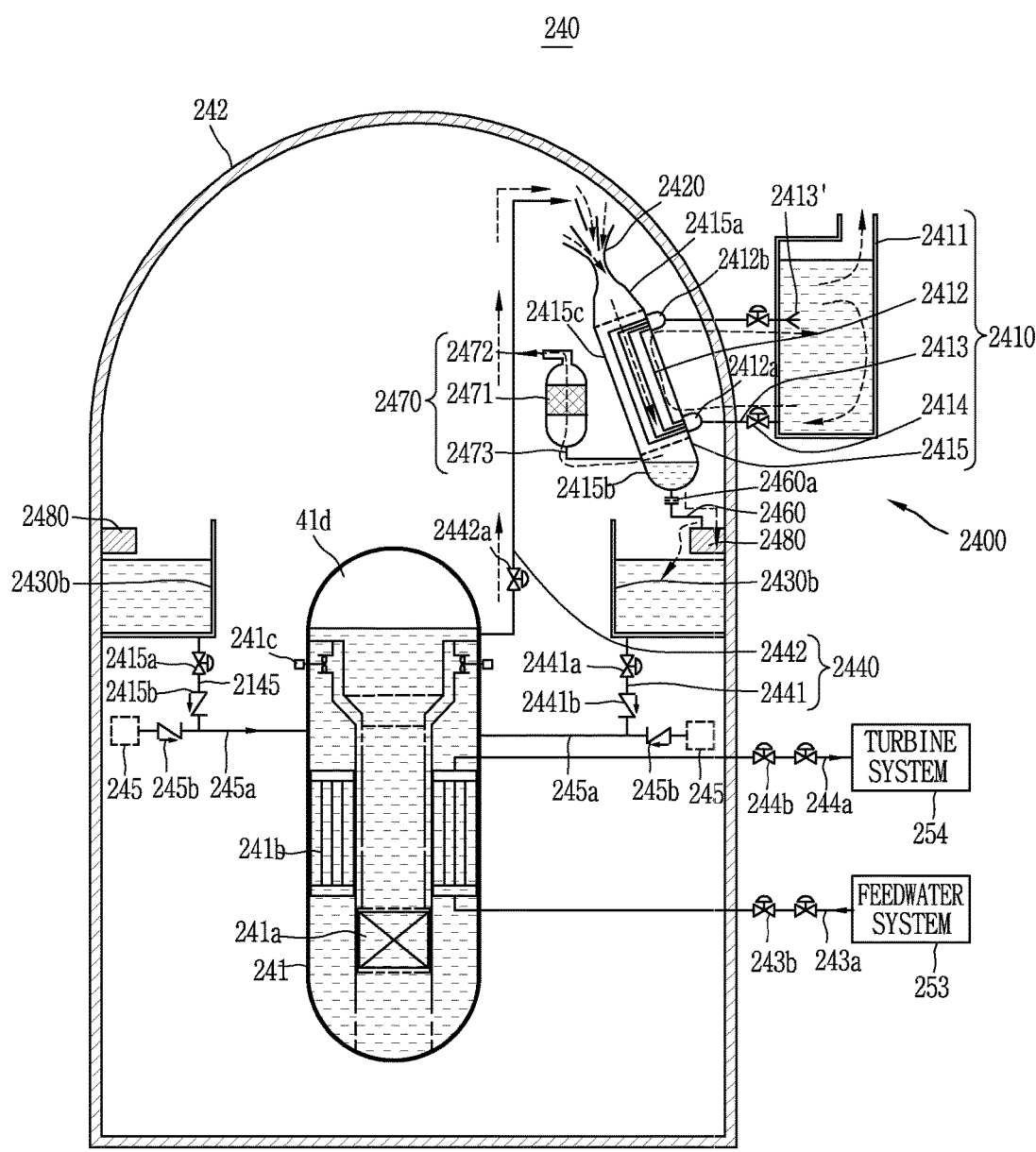
FIG. 19 is a conceptual view illustrating when an event occurs on a passive safely system and a nuclear power plant including the same illustrated in FIG. 18.

FIG. 18 is a conceptual view illustrating when a normal operation is carried out on a passive safely system 2400 and a nuclear power plant 240 including the same associated with yet still another embodiment of the present disclosure. FIG. 19 is a conceptual view illustrating when an event occurs on the passive safely system 2400 and the nuclear power plant 240 including the same illustrated in FIG. 18.

The passive safely system 2400 uses a primary system.

A second cooling water storage section 2430b stores borated water to be injected into a reactor coolant system 241 to maintain a water level of the reactor coolant system 241. The second cooling water storage section 2430b is connected to a safety injection line 245a by a fluid supply line 2441.

A steam discharge line 2442 is connected to the reactor coolant system 241 to supply the first fluid discharged from the reactor coolant system 241 to a circulation inducing jet device 2420.

An additive injection section 2480 may be installed at a line connected from a lower portion 2415b of a casing 2415 to the second cooling water storage section 2430b to inject an additive to condensate collected into the second cooling water storage section 2430b. For example, the additive injection section 2480 may be installed at an outlet of a return line 2460. The additive injection section 2480 may inject an additive to condensate returned to the second cooling water storage section through the return line 2460.

When a loss of coolant accident occurs in this embodiment, both the first fluid and second fluid are a primary fluid. However, in case of a steam line break, the first fluid is a primary fluid, and the second fluid is a secondary fluid. The primary fluid circulates the passive safely system 2400 from the time of being started from the second cooling water storage section 2430b to the time of being returned to the second cooling water storage section 2430b. The passive safely system 2400 is different from the foregoing embodiment in that it uses a primary system without using a steam generator 241b.

Figure 20:
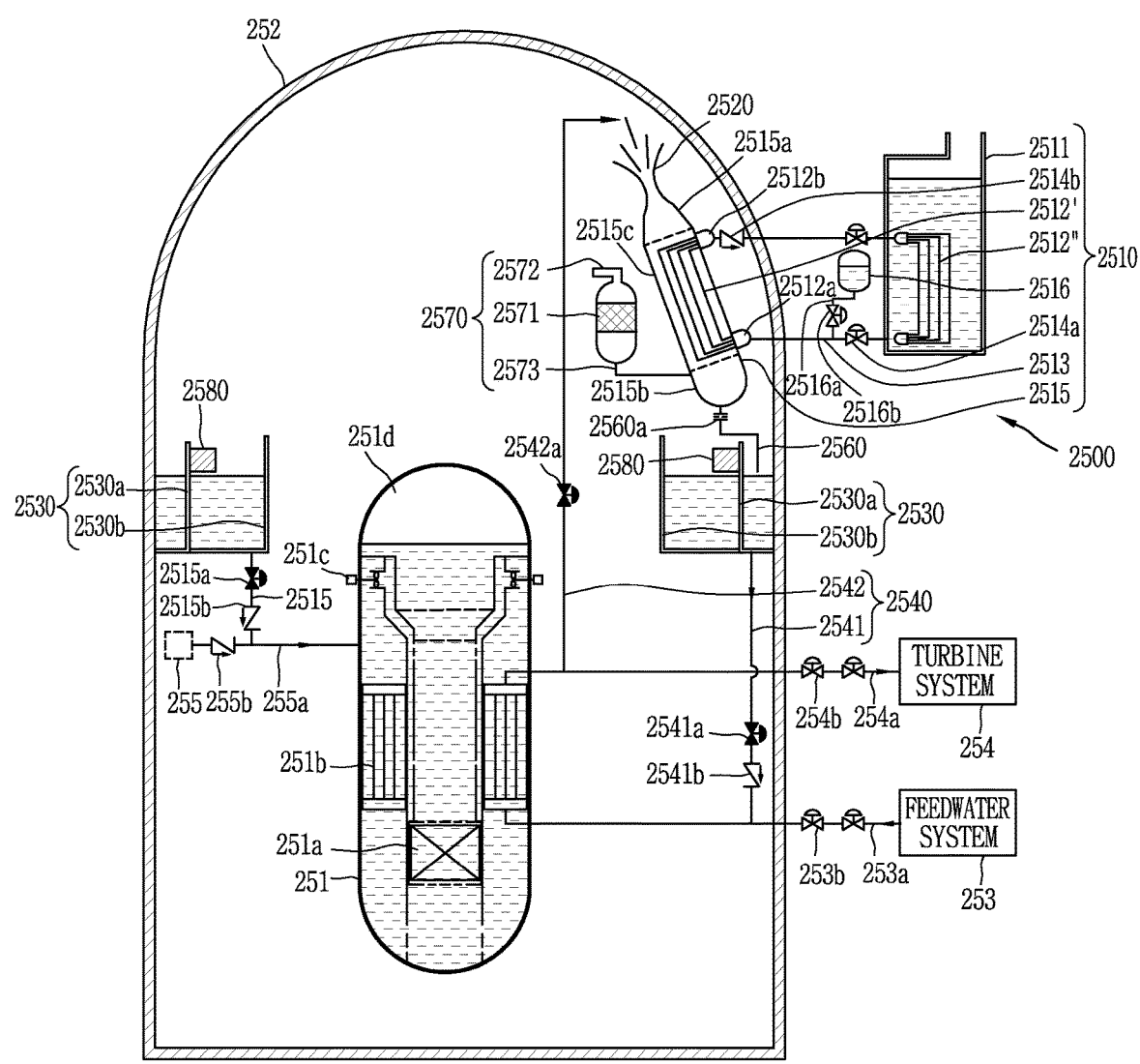
FIG. 20 is a conceptual view illustrating when a normal operation is carried out on a passive safely system and a nuclear power plant including the same associated with still yet another embodiment of the present disclosure.

FIG. 20 is a conceptual view illustrating when a normal operation is carried out on a passive safely system 2500 and a nuclear power plant 250 including the same associated with still yet another embodiment of the present disclosure.

Figure 21:
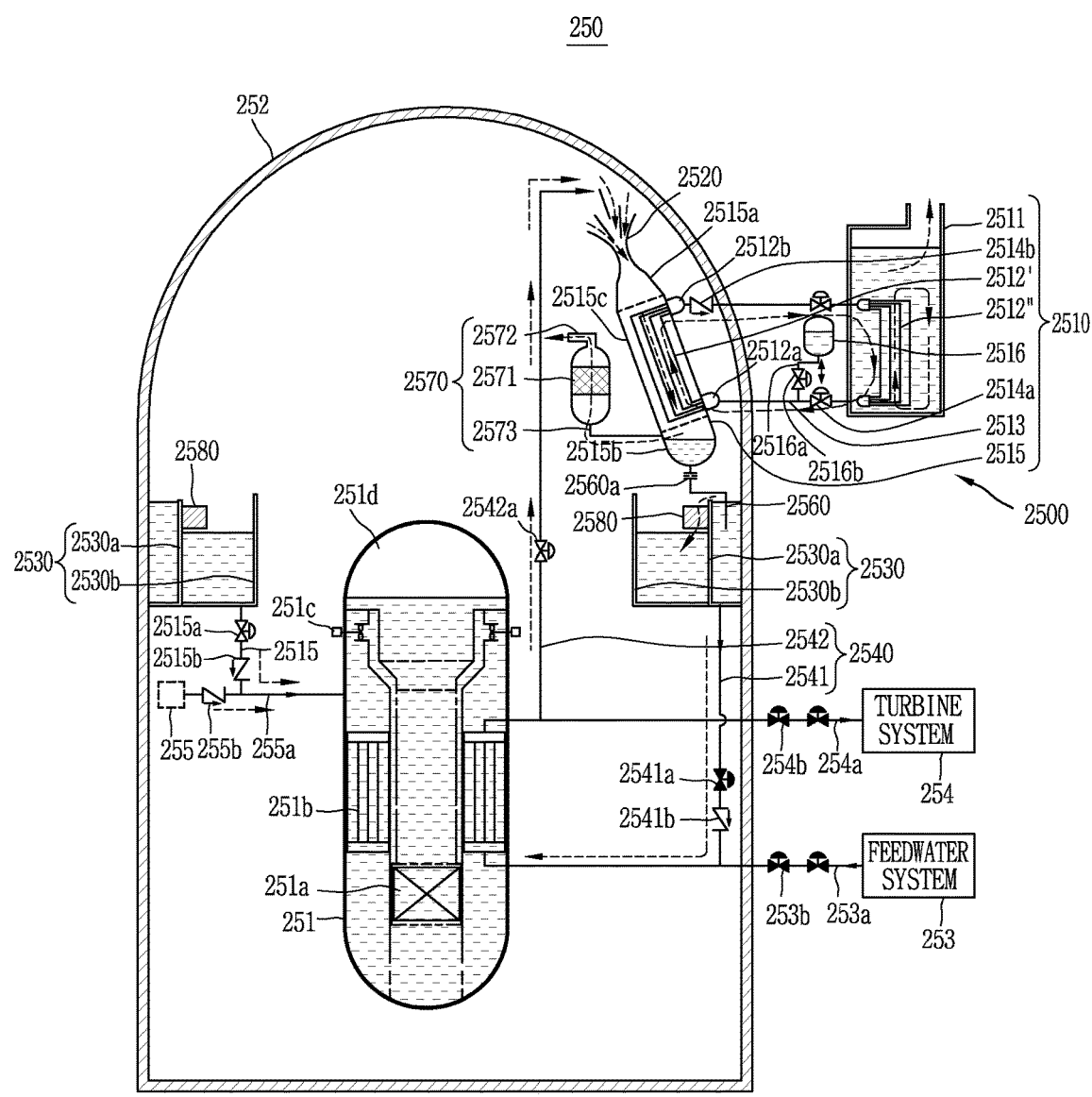
FIG. 21 is a conceptual view illustrating when an event occurs on a passive safely system and a nuclear power plant including the same illustrated in FIG. 20.

FIG. 21 is a conceptual view illustrating when an event occurs on the passive safely system 2500 and the nuclear power plant 250 including the same illustrated in FIG. 20.

A cooling section 2510 may include a first heat exchanger 2512' and a second heat exchanger 2512".

The first heat exchanger 2512' is installed within a containment 252 to cool the first fluid and second fluid jetted from a circulation inducing jet device 2520. The present embodiment illustrates an immersion type as an example. However, according to the characteristics of the nuclear power plant 250, the cooling section 2510 may be also configured with an air-cooled type by exposing the second heat exchanger 2512" to atmosphere and installing a duct (not shown) without installing the emergency cooling water storage section 2511.

The second heat exchanger 2512" is installed within the emergency cooling water storage section 2511. Furthermore, an isolation valve 2514a or check valve 2514b is installed at a connected line 2513. The second heat exchanger 2512" transfers heat that has transferred to a fluid circulating a closed flow path to cooling water within the emergency cooling water storage section 2511.

When the first fluid and second fluid are jetted to a casing 2515 from a circulation inducing jet device 2520, the first fluid and second fluid are cooled and condensed by a fluid circulating a closed flow path of the first heat exchanger 2512'. Condensate formed by the condensation of the first fluid and second fluid is collected into a lower portion 2515b of the casing 2515, and returned to a first cooling water storage section 2530a through a return line 2560.

The fluid within the closed flow path that has received heat from the first fluid and second fluid flows to the second heat exchanger 2512" through the connected line 2513. Heat in the second heat exchanger 2512" is transferred to the cooling water of the emergency cooling water storage section 2511 from the fluid within the closed flow path. The emergency coolant storage section evaporates cooling water to discharge heat to an outside thereof. The fluid continuously receives the heat of the first fluid and second fluid while circulating the closed flow path.

The cooling section 2510 may further include a makeup tank 2516.

The makeup tank 2516 is formed to store makeup water. The makeup tank 2516 is connected to the connected line 2513 to supply makeup water to the closed flow path or accommodate the excess water of the closed flow path. An isolation valve 2516b is installed at a line 2516a connecting between the makeup tank and the connected line 2513. The isolation valve 2516b may be configured to be open at a time point at which the supply of makeup water is required or configured to be open in advance. A fluid within the closed flow path may receive makeup water to maintain a sufficient water level.

Figure 22:
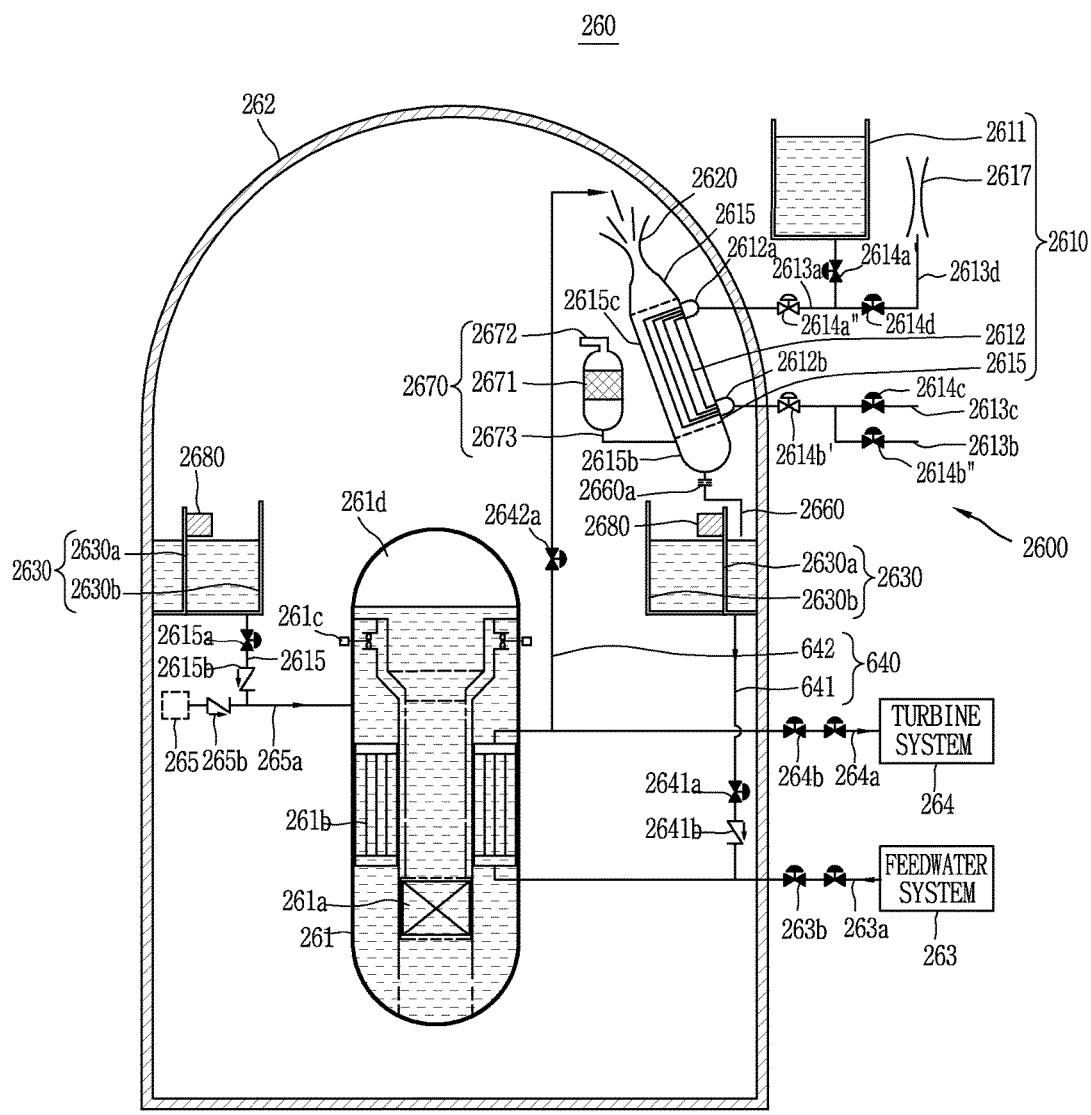
FIG. 22 is a conceptual view illustrating when a normal operation is carried out on a passive safely system and a nuclear power plant including the same associated with yet still another embodiment of the present disclosure.

FIG. 22 is a conceptual view illustrating when a normal operation is carried out on a passive safely system 2600 and a nuclear power plant 260 including the same associated with yet still another embodiment of the present disclosure.

An emergency cooling water storage section 2611 is installed outside a containment 262, and a heat exchanger 2612 is installed within the containment 262. A connected line 2613 may include a first connected line 2613a through a fourth connected line 2613d.

The first connected line 2613a is connected to the emergency cooling water storage section 2611 and the heat exchanger 2612 to form a flow path for supplying the cooling water of the emergency cooling water storage section 2611 to the heat exchanger 2612. In FIG. 22, the first connected line 2613*a* indicates a portion extended from a lower portion of the emergency cooling water storage section 2611 to a first header 2612*a* of the heat exchanger 2612. The first connected line 2613*a* allows the cooling water of the emergency cooling water storage section 2211 to flow into the heat exchanger 2612 to implement water-cooled type cooling.

A second connected line 2613*b* is extended from the heat exchanger 2612 to an outside of the containment 262 to discharge the cooling water of the emergency cooling water storage section 2611 that has passed through the heat exchanger 2612 to an outside thereof. In FIG. 22, the second connected line 2613*b* indicates a portion extended from a second header 2612*b* of the heat exchanger 2612 to an outside of the containment 222 and continuously extended in a downward bending manner.

A third connected line 2613*c* is branched from the second connected line 2613*b* to form a flow path for supplying atmosphere outside the containment 262 to the heat exchanger 2612. In FIG. 22, the third connected line 2613*c* indicates a portion branched from the second connected line 2613*b* and continuously extended to an outside of the containment 262. The third connected line 2613*c* allows the atmosphere of the containment 262 to flow into the heat exchanger 2612 so as to implement air-cooled type cooling when the cooling water of the emergency cooling water storage section 2611 is exhausted.

A fourth connected line 2613*d* is branched from the first connected line 2613*a* to an outside of the containment 262 to discharge atmosphere heated while passing through the heat exchanger 2612 to an outside thereof. In FIG. 22, the fourth connected line 2613*d* indicates a portion branched from the first connected line 2613*a* and connected to a duct 2617.

The duct 2617 is an air circulation system for exhausting atmosphere discharged from the heat exchanger 2612.

At least one of isolation valves 2614*a*', 614*a*", 614*b*', 614*b*", 614*c*, 614*d* is installed at each connected line 2613*a*, 613*b*, 613*c*, 613*d*. Cooling medium flowing into the heat exchanger 2612 differs according to which one of the isolation valves 2614*a*'. 614*a*", 614*b*', 614*b*", 614*c*, 614*d* is open. The cooling method of a cooling section 2610 may be switched to either one of water-cooled type cooling and air-cooled type cooling according to the switching of the isolation valves 2614*a*'. 614*a*", 614*b*', 614*b*", 614*c*, 614*d*. The present embodiment illustrates a case of mixing the water-cooled type with the air-cooled type, but may be also configured with an air-cooled exclusive type by removing a water-cooled type related facility according to the characteristics of the nuclear power plant.

Figure 23:
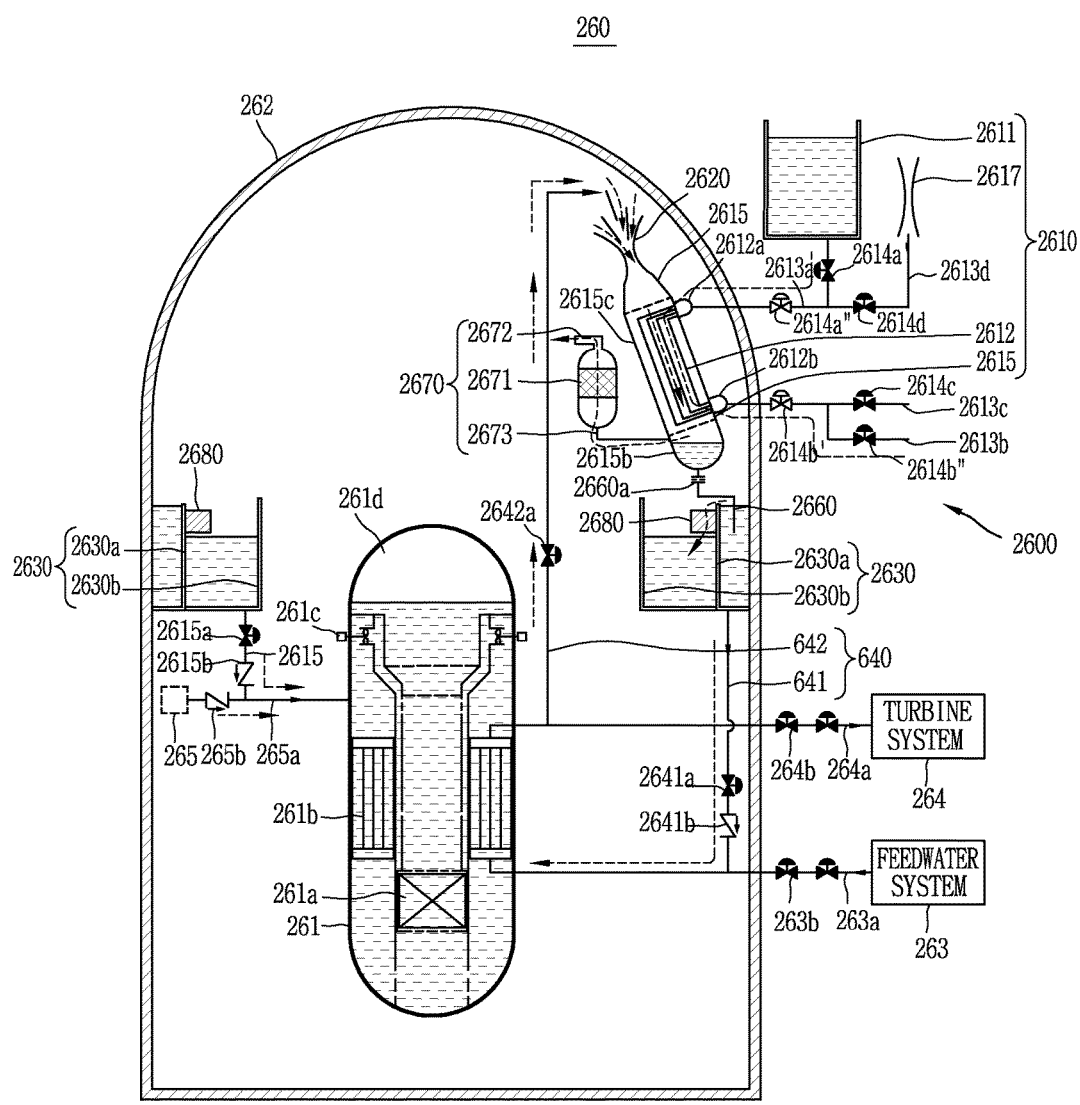
FIGS. 23 and 24 are conceptual views illustrating when an event occurs on a passive safely system and a nuclear power plant including the same illustrated in FIG. 22.
Figure 24:
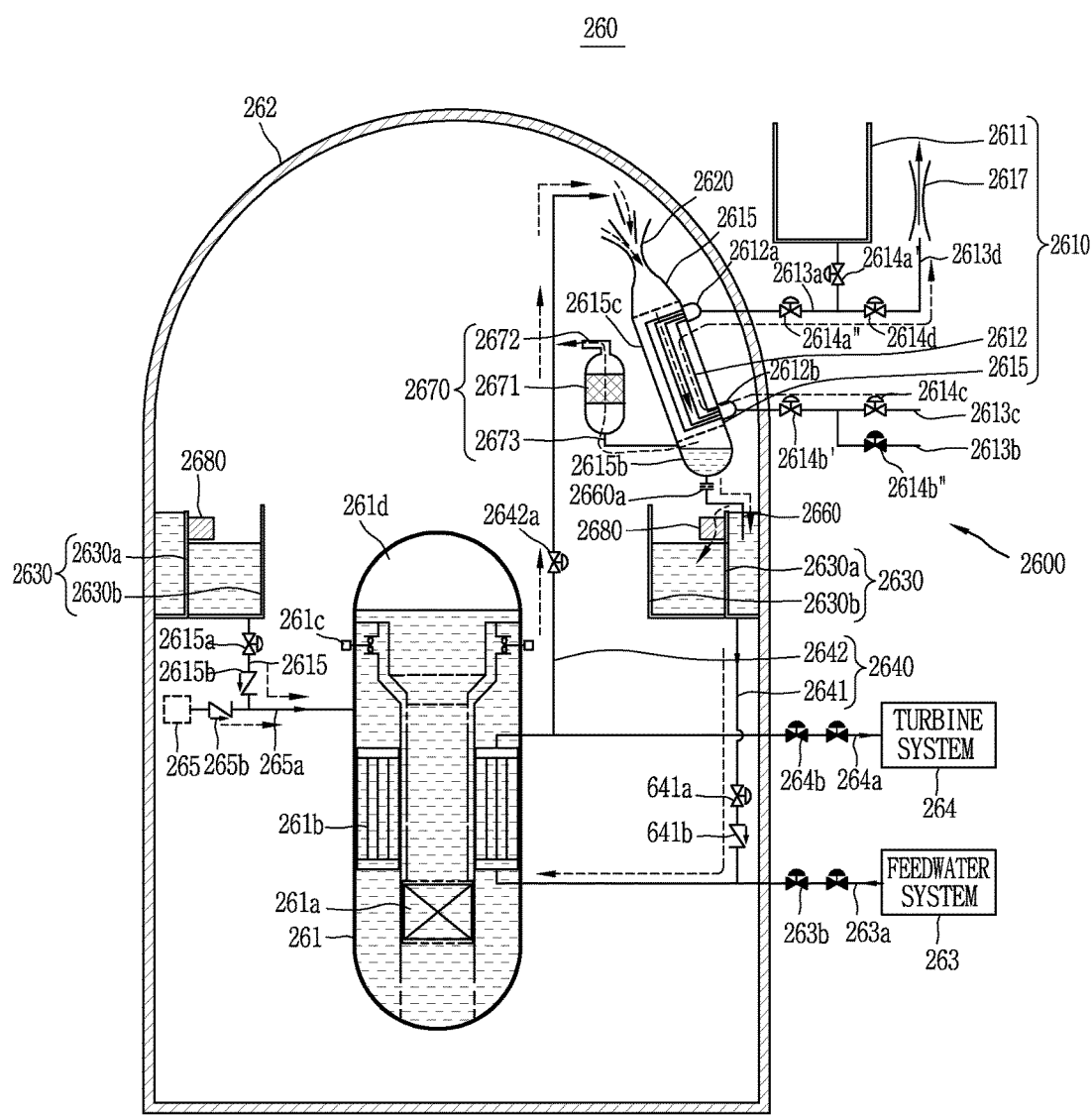

FIGS. 23 and 24 are conceptual views illustrating when an event occurs on a passive safely system 2600 and a nuclear power plant 260 including the same illustrated in FIG. 22. The passive safely system 2600 undergoes a sequential operation process in FIGS. 23 and 24.

First, referring to FIG. 23, the pure cooling water of a first cooling water storage section 2630*a* is supplied to a steam generator 261*b* as an accident occurs on the nuclear power plant. The first fluid discharged from the steam generator 261*b* is supplied to a circulation inducing jet device 2620 through a steam discharge line 2642. The circulation inducing jet device 2620 jets the first fluid and second fluid to an inside of the casing 2615.

When an accident occurs, isolation valves 2614*a*', 614*b*" installed at a first connected line 2613*a* and a second connected line 2613*b* are open by an associated signal. Other isolation valves 2614", 614' installed at the first connected line 2613*a* and second connected line 2613*b* may be set to be open at the time point at which the maintenance is required, and to be closed when the isolation of the containment 262 is required due to the damage of the system or the like during an accident. Cooling water that has been stored in the emergency cooling water storage section 2611 is injected into the heat exchanger 2612 by a gravity water head. The cooling water is injected into the heat exchanger 2612 through the first connected line 2613*a*.

The cooling water injected into the heat exchanger 2612 receives heat from the first fluid and second fluid in the heat exchanger 2612. The cooling water is discharged to an outside of the containment 262 through the second connected line 2613*b*. The first fluid and second fluid are cooled and condensed, and collected to a lower portion of the casing 2615. Noncondensible gas is filtered out by the filter facility 2670. Condensate is returned again to the first cooling water storage section through a return line 2660.

In the aspect that cooling water that has been stored in the emergency cooling water storage section 2611 is injected into the heat exchanger 2612, the cooling section 2610 illustrated in FIGS. 22 through 24 may be divided into an injection type. The injection type may be divided again into a gravity injection type and a gas injection type. The gravity injection type injects cooling water based on a gravity head. The gas injection type pressurizes cooling water with gas filled in the sealed emergency cooling water storage section 2211 to inject cooling water. In the aspect that cooling water injection in FIGS. 22 through 24 is carried out by gravity, the cooling section 2610 is divided into a gravity injection type.

The gravity injection type cooling may continue until the cooling water of the emergency cooling water storage section 2611 is exhausted. The operation of the passive safely system 2600 after the cooling water of the emergency cooling water storage section 2611 is exhausted will be described with reference to FIG. 24.

Referring to FIG. 24, an isolation valve 2614*b*" installed at the second connected line 2613*b* is closed, and isolation valves 2614*c*, 614*d* installed at the third connected line 2613*c* and fourth connected line 2613*d* are open. Accordingly, cooling carried out with a water-cooled type is switched to an air-cooled type. Atmosphere outside the containment 262 flows into the heat exchanger 2612 through the third connected line 2613*c*. The atmosphere that has received heat from the first fluid and second fluid in the heat exchanger 2612 flows again into the duct 2617 through the fourth connected line 2613*d*. The atmosphere is discharged to an outside thereof through the duct 2617.

As illustrated in FIGS. 23 and 24, when cooling is carried out with a mixed type of both the water-cooled type and air-cooled type, the passive safely system 2600 may be more securely prepared for an accident. Cooling is carried out with the water-cooled type having a high cooling efficiency at an early stage of the accident with a large thermal load, and consistent cooling may be carried out with the air-cooled type in which the makeup of cooling water is not required at a later stage of the accident with a low thermal load.

Figure 25:
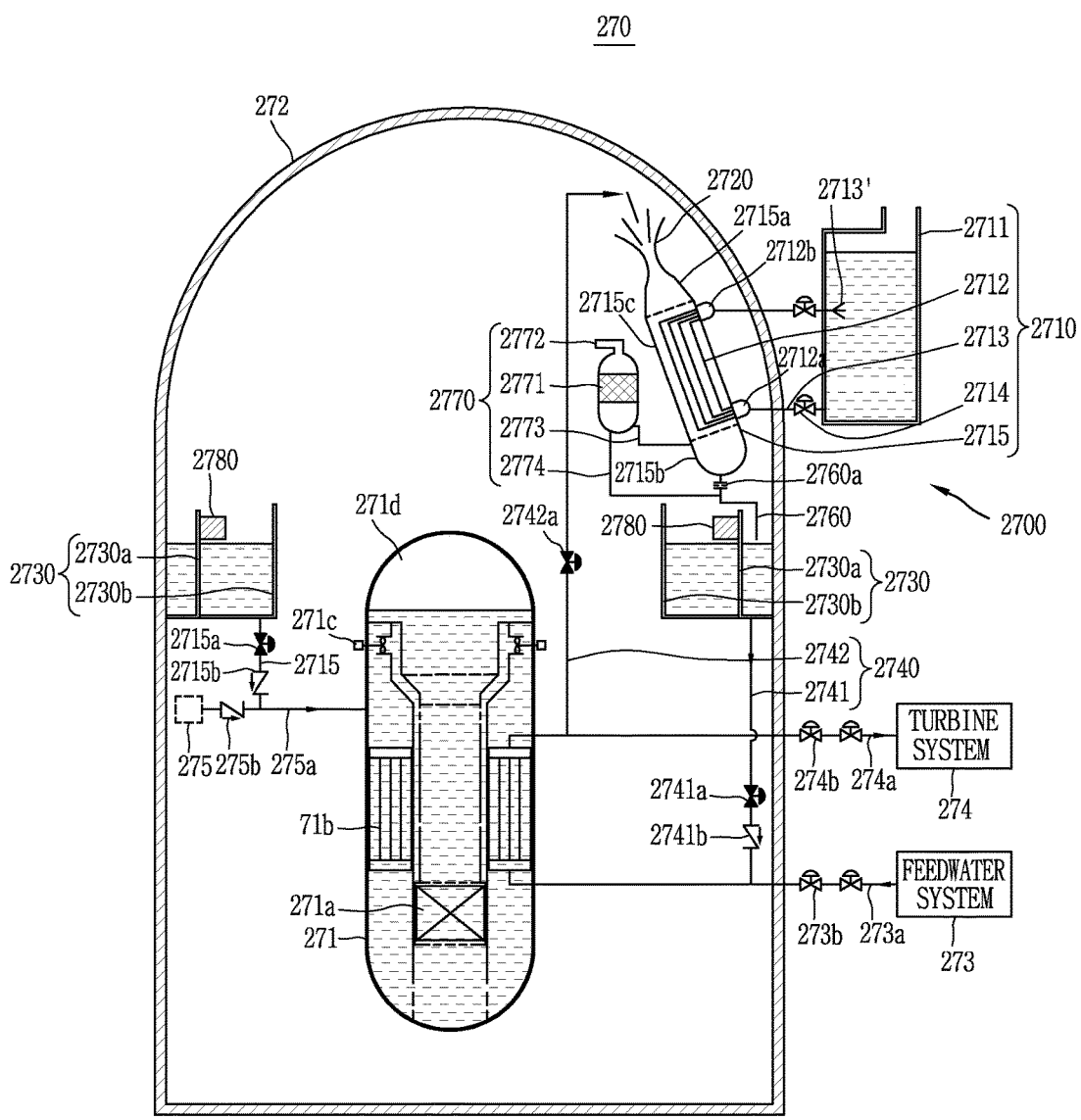
FIG. 25 is a conceptual view illustrating when a normal operation is carried out on a passive safely system and a nuclear power plant including the same associated with still yet another embodiment of the present disclosure.
Figure 26:
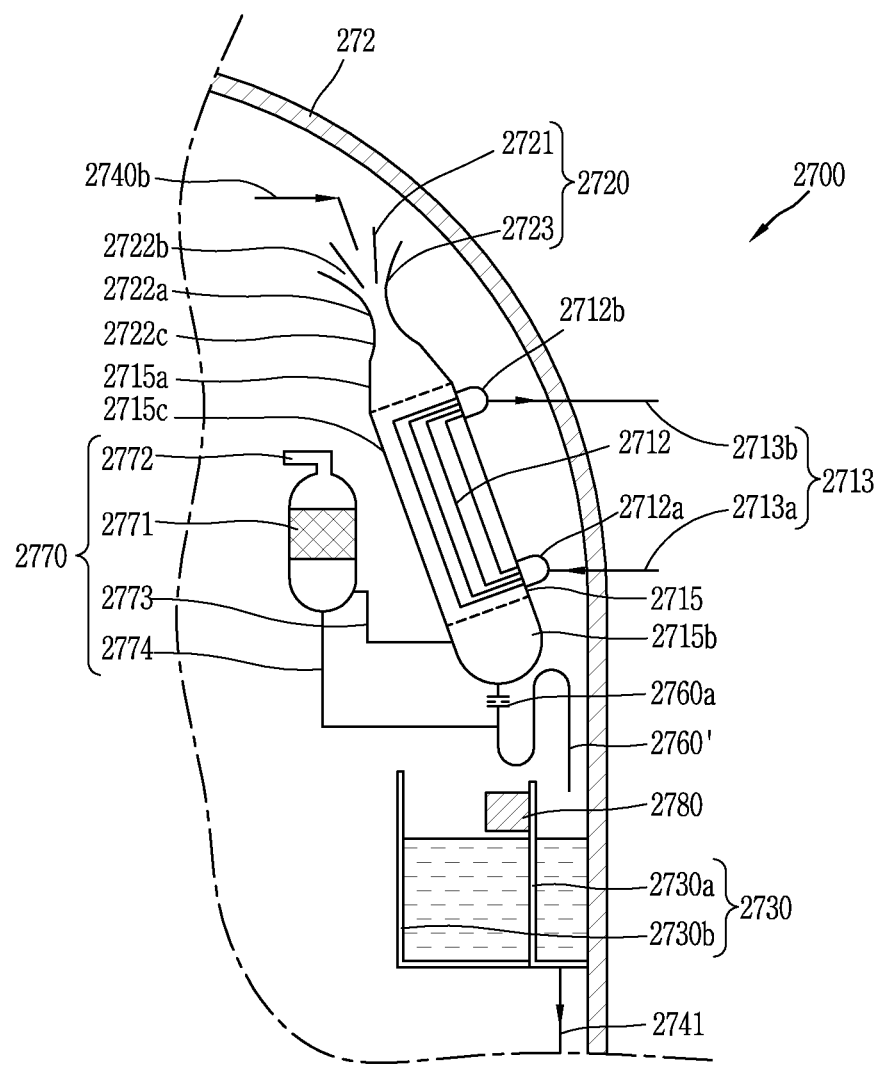
FIG. 26 is an enlarged conceptual view illustrating part of a passive safely system illustrated in FIG. 25.

FIG. 25 is a conceptual view illustrating when a normal operation is carried out on a passive safely system 2700 and a nuclear power plant 270 including the same associated with still yet another embodiment of the present disclosure, FIG. 26 is an enlarged conceptual view illustrating part of the passive safely system 2700 illustrated in FIG. 25.

A return line 2760 is connected to a lower portion of the casing 2715, and extended from the lower portion 2715*b* of the casing 2715 to a first cooling water storage section 2730*a*. The return line 2760 forms a flow path of condensate collected in the casing 2715. Condensate is returned to the first cooling water storage section 2730*a* from the casing 2715 through the return line 2760.

A return line 2774 is connected to a lower portion of a filter facility 2770 in addition to the return line 2760 connected to the lower portion 2715*b* of the casing 2715. In order to distinguish two return lines 2760, 2774, the return line 2760 connected to the casing 2715 is referred to as a first return line 2760, and the return line 2774 connected to a lower portion of the filter facility 2770 is referred to as a second return line 2774. The second return line 2774 is connected to the first return line 2760.

Condensate generated during the cooling process of the cooling section 2710 may be collected to a lower portion of the casing 2715, but part thereof may be flowed to a lower portion of the filter facility 2770. Condensate collected to the lower portion 2715*b* of the casing 2715 is returned to the first cooling water storage section 2730*a* through the first return line 2760. Condensate collected to the lower portion of the filter facility 2770 is returned to the first cooling water storage section 2730*a* through the second connected line 2774.

Referring to FIG. 26, at least part of the first return line 2760' forms a height difference from another part thereof. When the first return line 2760' with the foregoing structure is used, it may be possible to block the discharge of air, thereby preventing noncondensible gas containing radioactive materials from being discharged through the first return line 2760.

Figure 27:
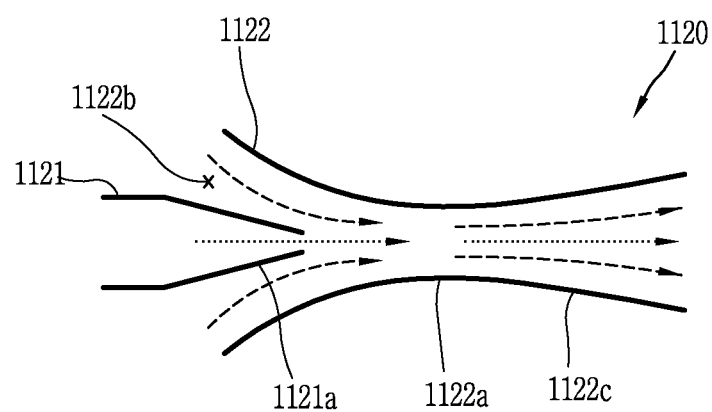
FIGS. 27 through 29 are conceptual views illustrating a circulation inducing jet device and a modified example thereof.
Figure 28:
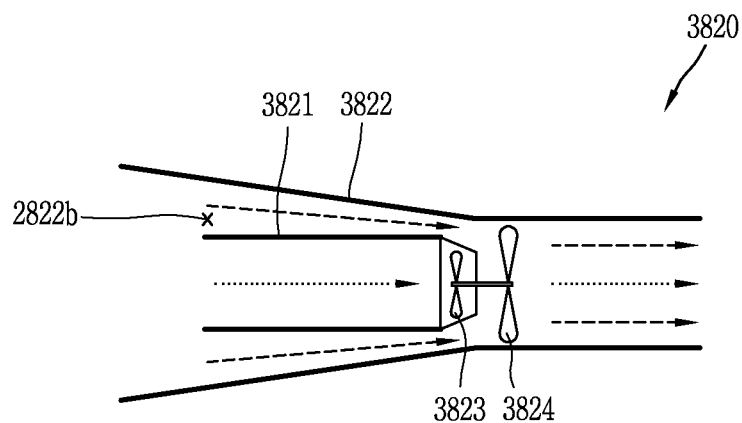
Figure 29:
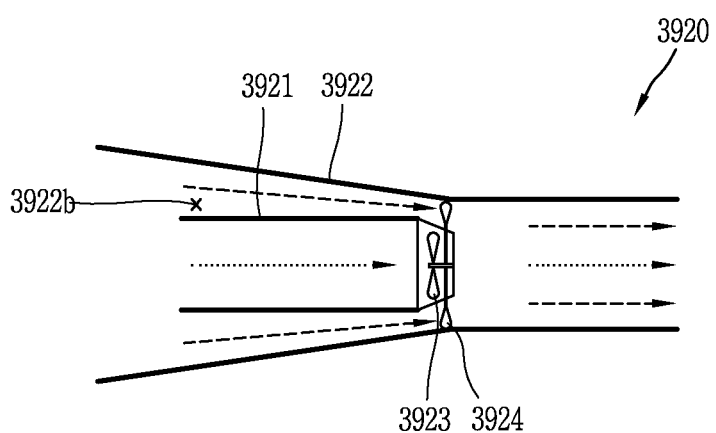

FIGS. 27 through 29 are conceptual views illustrating a circulation inducing jet device 1120 and a modified example thereof 3820, 3920.

FIG. 27 illustrates the circulation inducing jet device 1120 illustrated in FIG. 1, and uses the principle of a jet pump. The description thereof will be substituted by the earlier description.

FIGS. 28 and 29 as a modified example of a circulation inducing jet device 3820, 3920 different from FIG. 27 uses the principle of a turbine pump other than a jet pump. The circulation inducing jet device 3820, 3920 may include a first fluid jetting section 3821, 3921, a second fluid entraining section 3822*b*, 3922*b*, a circulating fluid jetting section 3822, 3922, a turbine blade 3823, 3923, and a pump impeller 3824, 3924.

The turbine blade 3823, 3923 and pump impeller 3824, 3924 are installed at an outlet of the first fluid jetting section 3821, 3921, and when the rotational force thereof is used, it may be possible to entrain the second fluid within the containment to promote circulation flow within the containment.

Referring to FIG. 28, a turbine may include a relatively small-sized turbine blade 3823 disposed at an outlet of the first fluid jetting section 3821 and a relatively large-sized pump impeller 3824 disposed at a position separated by a predetermined distance from the outlet of the first fluid jetting section 3821.

Referring to FIG. 29, the position of the pump impeller 3924 is disposed closer to the turbine blade 3923 than that of the pump impeller 3824 of FIG. 28.

In the circulation inducing jet device 3820, 3920 illustrated in FIGS. 28 and 29, the turbine blade 3823, 3923 induces an efficient jetting of the first fluid, and the pump impeller 3824, 3924 induces an efficient jetting of the second fluid.

The present disclosure may promote circulation flow using a circulation inducing jet device without merely depending on natural circulation to increase an efficiency of cooling an inside of the containment. The first fluid discharged from the reactor coolant system may be directly supplied to the heat exchanger without discharging the first fluid to an inside of the containment as well as the second fluid within the containment may be induced to the heat exchanger at the same time, thereby solving the problems of size increase, cost increase and safety degradation in the heat exchanger for cooling the containment in a nuclear power plant.

In addition, the present disclosure may filter out non-condensate using a filter facility without discharging the non-condensate as it is to an inside of the containment. Accordingly, it may be possible to reduce a concentration of radioactive materials within the containment at an early stage. As the concentration of radioactive materials is reduced, the present disclosure may decrease the exclusion area boundary.

The configurations and methods according to the above-described embodiments will not be applicable in a limited way to the foregoing passive safety facility and a nuclear power plant including the same, and all or part of each embodiment may be selectively combined and configured to make various modifications thereto.

The present disclosure may be used for safety enhancement in the nuclear power plant industry.

What is claimed is:

1. A passive safety facility for a nuclear power plant, comprising:
    a cooling section formed to cool fluid discharged from a steam generator installed inside a nuclear reactor coolant system along with fluid contained within an area between the nuclear reactor coolant system and a containment;
    a circulation inducing jet device configured to receive the fluid discharged from the steam generator, and formed to jet the received fluid to the cooling section, at least part of which is open toward an inside of the containment to entrain the fluid contained within the area between the nuclear reactor coolant system and the containment by a pressure drop caused while jetting the received fluid so as to jet the entrained fluid along with the received fluid; and
    a first cooling water storage section configured to store pure cooling water to be supplied to the steam generator so as to remove sensible heat within the nuclear reactor coolant system and residual heat in a core, wherein
    the containment is formed to surround the steam generator which is configured to generate steam or the nuclear reactor coolant system which is configured to accommodate the steam generator,
    a primary system of the nuclear power plant which a primary fluid circulates therein and a secondary system of the nuclear power plant which a second fluid circulates therein are isolated from each other at a boundary formed by the steam generator.

2. The passive safety facility of claim 1, wherein the circulation inducing jet device comprises:
    a fluid jetting section connected to the steam generator to receive the fluid discharged from the steam generator, and formed to jet the received fluid;
    a fluid entraining section formed in an annular shape around the fluid jetting section to entrain the fluid contained within the area between the nuclear reactor coolant system and the containment; and
    a circulating fluid jetting section configured to surround the fluid jetting section with a portion having an inner diameter larger than that of the fluid jetting section to form the fluid entraining section, and supply the received fluid and the entrained fluid to the cooling section, wherein the fluid jetting section comprises a nozzle configured to jet the received fluid to the circulating fluid jetting section, and the circulating fluid jetting section comprises:

a throat formed with an inner diameter smaller than that of an inlet of the nozzle to cause a local pressure drop while jetting the received fluid; and a diffuser configured to induce the received fluid and the entrained fluid that have passed through the throat to the cooling section.

3. The passive safety facility of claim 1, wherein the containment comprises:

a containment vessel formed of steel to surround the nuclear reactor coolant system; and a containment building formed of concrete to surround the containment vessel at a position separated from the containment vessel to form an air circulating flow path, and the circulation inducing jet device is configured to jet the received fluid and the entrained fluid to an inner wall surface of the containment vessel, and the cooling section cools the containment vessel using air that circulates through the air circulating flow path and a spraying of a passive containment vessel spray system which is configured to spray cooling water to an outer surface of the containment vessel.

4. The passive safety facility of claim 2, wherein the circulation inducing jet device comprises:

a turbine blade rotatably installed at an outlet of the first fluid jetting section to induce the jetting of the received fluid; and a pump impeller connected to the turbine blade to rotate along with the turbine blade, and induce the entrainment of the fluid contained with the area between the nuclear reactor coolant system and the containment through the fluid entraining section.

5. The passive safety facility of claim 1, further comprising:

a filter facility connected to an outlet of the cooling section to filter out noncondensible gas discharged from the cooling section, and collect radioactive materials filtered out from the noncondensible gas.

6. The passive safety facility of claim 5, wherein the filter facility comprises:

a filter or absorbent configured to separate the radioactive materials from the noncondensible gas;

a gas discharge section configured to discharge noncondensible gas filtered out while passing through the filter or absorbent to an inside of the containment; and a gas line connected to the outlet of the cooling section to supply the noncondensible gas to the filter or absorbent.

7. The passive safety facility of claim 1, wherein the cooling section cools the jetted fluid to form condensate, and the passive safety facility further comprises a cooling water storage section including the first cooling water storage section and formed to store cooling water therein, and the cooling water storage section is installed below the cooling section to collect the condensate discharged from the cooling section.

8. The passive safety facility of claim 1, wherein the cooling water storage section comprises:

a second cooling water storage section configured to store borated water to be injected into the nuclear reactor coolant system so as to maintain a level of the nuclear reactor coolant system.

9. The passive safety facility of claim 8, wherein the passive safety facility further comprises an additive injection section configured to inject an additive into the condensate for suppressing the revolatilization of condensate collected in the cooling water storage section, and the additive is formed to maintain a pH of the condensate above a preset value.

10. The passive safety facility of claim 9, wherein the cooling water storage section is configured to collect the condensate in the first cooling water storage section, and flow the condensate collected in the first cooling water storage section into the second cooling water storage section when a level of the collected condensate exceeds a reference level, and the additive injection section is installed at a flow path connected from the first cooling water storage section to the second cooling water storage section to inject the additive into the condensate flowing into the second cooling water storage section.

11. The passive safety facility of claim 9, wherein the additive injection section is installed at a flow path connected from the cooling section to the cooling water storage section to inject the additive to condensate collected in the cooling water storage section.

12. The passive safety facility of claim 7, further comprising:

a condensate holding section installed between the cooling section and the cooling water storage section to collect the condensate falling from the cooling section so as to return it to the cooling water storage section.

13. The passive safety facility of claim 12, wherein the passive safety facility further comprises:

a return line extended from an outlet of the cooling section or the condensate holding section to the cooling water storage section to return condensate generated during the cooling process of the cooling section to the cooling water storage section.

14. The passive safety facility of claim 13, wherein the passive safety facility further comprises a filter facility connected to an outlet of the cooling section to filter out noncondensible gas discharged from the cooling section so as to collect radioactive materials filtered out from the noncondensible gas, and the return line comprises:

a first return line connected to a lower portion of the casing to form a flow path of the condensate collected in the casing; and a second return line connected to a lower portion of the filter facility to form a flow path of the condensate collected in the filter facility.

15. The passive safety facility of claim 7, wherein the passive safety facility further comprises a fluid circulation section configured to circulate the cooling water of the cooling water storage section to the circulation inducing jet device through the steam generator, and the fluid circulation section comprises:

a fluid supply line connected to the cooling water storage section to supply cooling water within the cooling water storage section to the steam generator; and a steam discharge line connected to the steam generator and the circulation inducing jet device to supply the fluid discharged from the steam generator to the circulation inducing jet device.

16. The passive safety facility of claim 1, wherein the cooling section comprises:
- a heat exchanger installed within the containment to allow the cooling water of the emergency cooling water storage section or atmosphere outside the containment to pass therethrough so as to exchange heat with the fluid jetted from the circulation inducing jet device; and
- a casing configured to surround the heat exchanger to allow at least part thereof to protect the heat exchanger and accommodate the fluid jetted from the circulation inducing jet device.

17. The passive safety facility of claim 16, wherein the connected line comprises:
- a first connected line connected to the emergency cooling water storage section and the heat exchanger to form a flow path for supplying the cooling water of the emergency cooling water storage section to the heat exchanger;
- a second connected line extended from the heat exchanger to an outside of the containment to discharge the coolant of the emergency cooling water storage section that has passed through the heat exchanger to an outside thereof;
- a third connected line branched from the second connected line and extended to an outside of the containment to form a flow path for supplying atmosphere outside the containment to the heat exchanger; and
- a fourth connected line branched from the first connected line and extended to an outside of the containment to discharge atmosphere heated while passing through the heat exchanger to an outside thereof,
- wherein the passive safety facility further comprises isolation valves installed at the first connected line through the fourth connected line, respectively, and
- the isolation valves are open or closed by a preset signal to switch between water-cooled type cooling using the cooling water and air-cooled type cooling using the atmosphere when the cooling water of the emergency cooling water storage section is exhausted.

18. The passive safety facility of claim 1, wherein the passive safety facility further comprises a filter facility connected to an outlet of the cooling section to filter out noncondensible gas discharged from the cooling section so as to collect radioactive materials filtered out from the noncondensible gas, and
- the cooling section comprises a heat exchanger installed outside the containment to connect to a connected line passing through the containment, and allow fluid flowing in from the circulation inducing jet device to pass through the connected line to exchange heat with the cooling water of the emergency cooling water storage section or atmosphere outside the containment, and
- the filter facility is installed within the containment, and connected to the heat exchanger by the connected line to receive noncondensible gas and condensate from the heat exchanger.

19. The passive safety facility of claim 1, wherein the cooling section comprises:
- a first heat exchanger installed within the containment to cool the fluid jetted from the circulation inducing jet device; and
- a second heat exchanger installed outside the containment, and connected to the first heat exchanger by a connected line passing through the containment to form a closed flow path to transfer heat that has transferred to a fluid circulating the closed flow path to cooling water within the emergency cooling water storage section or atmosphere outside the containment.

20. A passive safety facility for a nuclear power plant, comprising:
- a cooling section formed to cool fluid discharged from a nuclear reactor coolant system along with fluid contained within an area between the nuclear reactor coolant system and a containment; and
- a circulation inducing jet device configured to receive the fluid discharged from the nuclear reactor coolant system, and formed to jet the received fluid to the cooling section, at least part of which is open toward an inside of the containment to entrain the fluid contained within the area between the nuclear reactor coolant system and the containment by a pressure drop caused while jetting the received fluid so as to jet the entrained fluid along with the received fluid, wherein
- the containment is formed to surround the steam generator which is configured to generate steam or the nuclear reactor coolant system which is configured to accommodate the steam generator,
- the circulation inducing jet device comprises:
- a fluid jetting section connected to the nuclear reactor coolant system to receive the fluid discharged from the nuclear reactor coolant system, and formed to jet the received fluid;
- a fluid entraining section formed in an annular shape around the fluid jetting section to entrain the fluid contained within the area between the nuclear reactor coolant system and the containment;
- a circulating fluid jetting section configured to surround the fluid jetting section with a portion having an inner diameter larger than that of the fluid jetting section to form the fluid entraining section, and supply the received fluid and the entrained fluid to the cooling section;
- a turbine blade rotatably installed at an outlet of the jetting section to induce the jetting of the received fluid; and
- a pump impeller connected to the turbine blade to rotate along with the turbine blade, and induce the entrainment of the fluid contained with the area between the nuclear reactor coolant system and the containment through the fluid entraining section.

* * * * *